(12) United States Patent
Garvey et al.

(10) Patent No.: US 10,963,346 B2
(45) Date of Patent: Mar. 30, 2021

(54) SCALABLE METHODS AND SYSTEMS FOR APPROXIMATING STATISTICAL DISTRIBUTIONS

(71) Applicant: Oracle International Corporation, Redwood Shores, CA (US)

(72) Inventors: Dustin Garvey, Exeter, NH (US); Sampanna Shahaji Salunke, Dublin, CA (US); Uri Shaft, Fremont, CA (US); Brent Arthur Enck, Roseville, CA (US); Sumathi Gopalakrishnan, Fremont, CA (US)

(73) Assignee: Oracle international Corporation, Redwood Shores (CA)

( * ) Notice: Subject to any disclaimer, the term of this patent is extended or adjusted under 35 U.S.C. 154(b) by 219 days.

(21) Appl. No.: 16/000,677

(22) Filed: Jun. 5, 2018

(65) Prior Publication Data
US 2019/0370115 A1    Dec. 5, 2019

(51) Int. Cl.
*G06F 11/14* (2006.01)
*H04L 12/26* (2006.01)
*G06K 9/62* (2006.01)
*G06F 17/18* (2006.01)

(52) U.S. Cl.
CPC .......... *G06F 11/1428* (2013.01); *G06F 17/18* (2013.01); *G06K 9/6218* (2013.01); *H04L 43/04* (2013.01); *H04L 43/16* (2013.01)

(58) Field of Classification Search
CPC ....... G06F 11/1428; G06F 17/18; H04L 43/04
USPC ........................................................ 709/224
See application file for complete search history.

(56) References Cited

U.S. PATENT DOCUMENTS

| | | | |
|---|---|---|---|
| 6,298,063 B1 | 10/2001 | Coile et al. | |
| 6,438,592 B1* | 8/2002 | Killian | H04L 41/22 709/203 |
| 6,597,777 B1 | 7/2003 | Ho | |
| 6,643,613 B2 | 11/2003 | McGee et al. | |
| 6,996,599 B1 | 2/2006 | Anders et al. | |
| 7,343,375 B1 | 3/2008 | Dulac | |

(Continued)

FOREIGN PATENT DOCUMENTS

| | | |
|---|---|---|
| CN | 105426411 A | 3/2016 |
| CN | 109359763 A | 2/2019 |

(Continued)

OTHER PUBLICATIONS

Jain and Chlamtac, P-Square Algorithm, ACM, Oct. 1985 (10 pages).*

(Continued)

*Primary Examiner* — Wing F Chan
*Assistant Examiner* — Leon Y Tseng
(74) *Attorney, Agent, or Firm* — Invoke

(57) ABSTRACT

Techniques for generating distribution approximations with low memory footprints are disclosed. In some embodiments, a system receives a first set of values that measure one or more metrics of at least one computing resource. A set of clusters are generated, within volatile or non-volatile memory, that approximate a distribution of the first set of values measuring the one or more metrics of the at least one computing resource. The set of clusters is transformed, within volatile or non-volatile memory, to a piecewise approximation of a function for the first set of values.

20 Claims, 15 Drawing Sheets

(56) References Cited

U.S. PATENT DOCUMENTS

| | | |
|---|---|---|
| 7,529,991 B2 | 5/2009 | Ide et al. |
| 7,672,814 B1 | 3/2010 | Raanan et al. |
| 7,739,143 B1 | 6/2010 | Dwarakanath et al. |
| 7,739,284 B2 | 6/2010 | Aggarwal et al. |
| 7,783,510 B1 | 8/2010 | Gilgur et al. |
| 7,987,106 B1 | 7/2011 | Aykin |
| 8,200,454 B2 | 6/2012 | Dorneich et al. |
| 8,229,876 B2 | 7/2012 | Roychowdhury |
| 8,234,236 B2 | 7/2012 | Beaty et al. |
| 8,363,961 B1 | 1/2013 | Avidan et al. |
| 8,576,964 B2 | 11/2013 | Taniguchi et al. |
| 8,583,649 B2 | 11/2013 | Ailon et al. |
| 8,635,328 B2 | 1/2014 | Corley et al. |
| 8,650,299 B1 | 2/2014 | Huang et al. |
| 8,676,964 B2 | 3/2014 | Gopalan et al. |
| 8,694,969 B2 | 4/2014 | Bernardini et al. |
| 8,776,066 B2 | 7/2014 | Krishnamurthy et al. |
| 8,880,525 B2 | 11/2014 | Galle et al. |
| 8,930,757 B2 | 1/2015 | Nakagawa |
| 8,949,677 B1 | 2/2015 | Brundage et al. |
| 9,002,774 B2 | 4/2015 | Karlsson |
| 9,053,171 B2 | 6/2015 | Ailon et al. |
| 9,141,914 B2 | 9/2015 | Viswanathan et al. |
| 9,147,167 B2 | 9/2015 | Urmanov et al. |
| 9,195,563 B2 | 11/2015 | Scarpelli |
| 9,218,232 B2 | 12/2015 | Khalastchi et al. |
| 9,292,408 B2 | 3/2016 | Bernstein et al. |
| 9,323,599 B1 | 4/2016 | Iyer et al. |
| 9,323,837 B2 | 4/2016 | Zhao et al. |
| 9,330,119 B2 | 5/2016 | Chan et al. |
| 9,355,357 B2 | 5/2016 | Hao et al. |
| 9,367,382 B2 | 6/2016 | Yabuki |
| 9,389,946 B2 | 7/2016 | Higuchi |
| 9,471,778 B1 | 10/2016 | Seo et al. |
| 9,495,220 B2 | 11/2016 | Talyansky |
| 9,495,395 B2 | 11/2016 | Chan et al. |
| 9,507,718 B2 | 11/2016 | Rash et al. |
| 9,514,213 B2 | 12/2016 | Wood et al. |
| 9,529,630 B1 | 12/2016 | Fakhouri et al. |
| 9,658,910 B2 | 5/2017 | Poola et al. |
| 9,658,916 B2 | 5/2017 | Yoshinaga et al. |
| 9,692,662 B2 | 6/2017 | Chan et al. |
| 9,710,493 B2 | 7/2017 | Wang et al. |
| 9,727,533 B2 | 8/2017 | Thibaux |
| 9,740,402 B2 | 8/2017 | Manoharan et al. |
| 9,779,361 B2 | 10/2017 | Jones et al. |
| 9,811,394 B1 | 11/2017 | Kogias et al. |
| 9,961,571 B2 | 5/2018 | Yang et al. |
| 10,073,906 B2 | 9/2018 | Lu et al. |
| 10,210,036 B2 | 2/2019 | Iyer et al. |
| 2002/0019860 A1 | 2/2002 | Lee et al. |
| 2002/0092004 A1 | 7/2002 | Lee et al. |
| 2002/0183972 A1 | 12/2002 | Enck et al. |
| 2002/0188650 A1 | 12/2002 | Sun et al. |
| 2003/0149603 A1 | 8/2003 | Ferguson et al. |
| 2003/0224344 A1 | 12/2003 | Shamir et al. |
| 2004/0088406 A1 | 5/2004 | Corley et al. |
| 2005/0119982 A1 | 6/2005 | Ito et al. |
| 2005/0132030 A1 | 6/2005 | Hopen et al. |
| 2005/0159927 A1 | 7/2005 | Cruz et al. |
| 2005/0193281 A1 | 9/2005 | Ide et al. |
| 2006/0087962 A1 | 4/2006 | Golia et al. |
| 2006/0106743 A1 | 5/2006 | Horvitz |
| 2006/0212593 A1 | 9/2006 | Patrick et al. |
| 2006/0287848 A1 | 12/2006 | Li et al. |
| 2007/0011281 A1 | 1/2007 | Jhoney et al. |
| 2007/0150329 A1 | 6/2007 | Brook et al. |
| 2007/0179836 A1 | 8/2007 | Juang et al. |
| 2008/0221974 A1 | 9/2008 | Gilgur et al. |
| 2008/0288089 A1 | 11/2008 | Pettus et al. |
| 2009/0030752 A1 | 1/2009 | Senturk-Doganaksoy et al. |
| 2010/0027552 A1 | 2/2010 | Hill |
| 2010/0036857 A1 | 2/2010 | Marvasti et al. |
| 2010/0050023 A1 | 2/2010 | Scarpelli et al. |
| 2010/0082132 A1 | 4/2010 | Marruchella et al. |
| 2010/0082697 A1 | 4/2010 | Gupta et al. |
| 2010/0185499 A1 | 7/2010 | Dwarakanath et al. |
| 2010/0257133 A1 | 10/2010 | Crowe et al. |
| 2010/0324869 A1 | 12/2010 | Cherkasova et al. |
| 2011/0022879 A1 | 1/2011 | Chavda et al. |
| 2011/0040575 A1 | 2/2011 | Wright et al. |
| 2011/0125894 A1 | 5/2011 | Anderson et al. |
| 2011/0126197 A1 | 5/2011 | Larsen et al. |
| 2011/0126275 A1 | 5/2011 | Anderson et al. |
| 2011/0213788 A1 | 9/2011 | Zhao et al. |
| 2011/0265164 A1 | 10/2011 | Lucovsky et al. |
| 2012/0005359 A1 | 1/2012 | Seago et al. |
| 2012/0051369 A1 | 3/2012 | Bryan et al. |
| 2012/0066389 A1 | 3/2012 | Hegde et al. |
| 2012/0110462 A1 | 5/2012 | Eswaran et al. |
| 2012/0110583 A1 | 5/2012 | Balko et al. |
| 2012/0203823 A1 | 8/2012 | Manglik et al. |
| 2012/0240072 A1 | 9/2012 | Altamura et al. |
| 2012/0254183 A1 | 10/2012 | Ailon et al. |
| 2012/0278663 A1 | 11/2012 | Hasegawa |
| 2012/0323988 A1 | 12/2012 | Barzel et al. |
| 2013/0151179 A1 | 6/2013 | Gray |
| 2013/0326202 A1 | 12/2013 | Rosenthal et al. |
| 2013/0329981 A1 | 12/2013 | Hiroike |
| 2014/0058572 A1 | 2/2014 | Stein et al. |
| 2014/0067757 A1 | 3/2014 | Ailon et al. |
| 2014/0095422 A1 | 4/2014 | Solomon et al. |
| 2014/0101300 A1 | 4/2014 | Rosensweig et al. |
| 2014/0215470 A1 | 7/2014 | Iniguez |
| 2014/0310235 A1 | 10/2014 | Chan et al. |
| 2014/0310714 A1 | 10/2014 | Chan et al. |
| 2014/0325649 A1 | 10/2014 | Zhang |
| 2014/0379717 A1 | 12/2014 | Urmanov et al. |
| 2015/0032775 A1 | 1/2015 | Yang et al. |
| 2015/0033084 A1 | 1/2015 | Sasturkar et al. |
| 2015/0040142 A1 | 2/2015 | Cheetancheri et al. |
| 2015/0046123 A1 | 2/2015 | Kato |
| 2015/0046920 A1 | 2/2015 | Allen |
| 2015/0065121 A1 | 3/2015 | Gupta et al. |
| 2015/0180734 A1 | 6/2015 | Maes et al. |
| 2015/0242243 A1 | 8/2015 | Balakrishnan et al. |
| 2015/0244597 A1 | 8/2015 | Maes et al. |
| 2015/0248446 A1 | 9/2015 | Nordstrom et al. |
| 2015/0251074 A1 | 9/2015 | Ahmed et al. |
| 2015/0296030 A1 | 10/2015 | Maes et al. |
| 2015/0302318 A1 | 10/2015 | Chen et al. |
| 2015/0312274 A1 | 10/2015 | Bishop et al. |
| 2015/0317589 A1 | 11/2015 | Anderson et al. |
| 2016/0034328 A1 | 2/2016 | Poola et al. |
| 2016/0042289 A1 | 2/2016 | Poola et al. |
| 2016/0092516 A1 | 3/2016 | Poola et al. |
| 2016/0105327 A9 | 4/2016 | Cremonesi et al. |
| 2016/0139964 A1 | 5/2016 | Chen et al. |
| 2016/0171037 A1 | 6/2016 | Mathur et al. |
| 2016/0253381 A1 | 9/2016 | Kim et al. |
| 2016/0283533 A1 | 9/2016 | Urmanov et al. |
| 2016/0292611 A1 | 10/2016 | Boe et al. |
| 2016/0294773 A1 | 10/2016 | Yu et al. |
| 2016/0299938 A1 | 10/2016 | Malhotra et al. |
| 2016/0299961 A1 | 10/2016 | Olsen |
| 2016/0321588 A1 | 11/2016 | Das et al. |
| 2016/0342909 A1 | 11/2016 | Chu et al. |
| 2016/0357674 A1 | 12/2016 | Waldspurger et al. |
| 2016/0378809 A1 | 12/2016 | Chen et al. |
| 2017/0061321 A1 | 3/2017 | Maiya et al. |
| 2017/0249564 A1 | 8/2017 | Garvey et al. |
| 2017/0249648 A1 | 8/2017 | Garvey et al. |
| 2017/0249649 A1 | 8/2017 | Garvey et al. |
| 2017/0249763 A1 | 8/2017 | Garvey et al. |
| 2017/0262223 A1 | 9/2017 | Dalmatov et al. |
| 2017/0329660 A1 | 11/2017 | Salunke et al. |
| 2017/0351563 A1 | 12/2017 | Miki et al. |
| 2017/0364851 A1 | 12/2017 | Maheshwari et al. |
| 2018/0026907 A1 | 1/2018 | Miller et al. |
| 2018/0039555 A1 | 2/2018 | Salunke et al. |
| 2018/0052804 A1 | 2/2018 | Mikami et al. |
| 2018/0053207 A1 | 2/2018 | Modani et al. |
| 2018/0059628 A1 | 3/2018 | Yoshida |
| 2018/0081629 A1* | 3/2018 | Kuhhirte .............. G06F 16/2471 |

(56) References Cited

U.S. PATENT DOCUMENTS

| | | | |
|---|---|---|---|
| 2018/0321989 | A1 | 11/2018 | Shetty et al. |
| 2018/0324199 | A1 | 11/2018 | Crotinger et al. |
| 2018/0330433 | A1 | 11/2018 | Frenzel et al. |
| 2019/0042982 | A1 | 2/2019 | Qu et al. |
| 2019/0065275 | A1 | 2/2019 | Wong et al. |
| 2019/0305876 | A1* | 10/2019 | Sundaresan ............. H04L 43/08 |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Faraz Rasheed, "A Framework for Periodic Outlier Pattern Detection in Time-Series Sequences," May 2014, IEEE.

Dunning et al., Computing Extremely Accurate Quantiles Using t-Digests.

Yokoyama, Tetsuya, "Windows Server 2008, Certification Test, Part 5: Reliability", Apr. 15, 2008, pp. 124-125 along with 4 pages of English Translation.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Voras et al.,"Criteria for evaluation of Open Source Cloud Computing Solutions", Information Technology Interfaces (ITI), Proceedings of the ITI2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", Omega, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Slipetskyy, Rostyslav, "Security Issues in OpenStack", Master's Thesis, Technical University of Denmark, Jun. 2011, 90 pages.

Nurmi D et al: "The Eucalyptus Open-Source Cloud-Computing System", Cluster Computing and the Grid, 2009. CCGRID '09. 9th IEEE/ACM International Symposium On, IEEE, Piscataway, NJ, USA, May 18, 2009 (May 18, 2009), pp. 124-131.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (Grid 2007), Sep. 19-21, 2007, Austin, Texas, USA, Proceedings.

Gueyoung Jung et al: "Performance and availability aware regeneration for cloud based multitier applications", Dependable Systems and Networks (DSN), 2010 IEEE/IFIP International Conference On, IEEE, Piscataway, NJ, USA, Jun. 28, 2010 (Jun. 28, 2010), pp. 497-506.

Greunen, "Forecasting Methods for Cloud Hosted Resources, a comparison," 2015, 11th International Conference on Network and Service Management (CNSM), pp. 29-35 (Year 2015).

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Charapko, Gorilla—Facebook's Cache for Time Series Data, http://charap.co/gorilla-facebooks-cache-for-monitoring-data/, Jan. 11, 2017.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

Ahmed, Reservoir-based network traffic stream summarization for anomaly detection, Article in Pattern Analysis and Applications, Oct. 2017.

"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"OpenStack Compute Administration Manual", Mar. 1, 2011 (Mar. 3, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

Wilks, Samuel S. "Determination of sample sizes for setting tolerance limits." The Annals of Mathematical Statistics 12.1 (1941): 91-96.

Lin, Xuemin, et al. "Continuously maintaining quantile summaries of the most recent n elements over a data stream." IEEE, 2004.

Greenwald et al. "Space-efficient online computation of quantile summaries." ACM Proceedings of the 2001 SIGMOD international conference on Management of data pp. 58-66.

* cited by examiner

| Samples | | 5% Percentile | X Start | X End | X End - X Start |
|---|---|---|---|---|---|
| 400 → | | 402 → | | 406 → | |
| Samples | | 5% Percentile | X Start | X End | X End - X Start | 90% MCI |
| 10 | 12 | 10 | 12 | 12 | 12 | |
| 10 | 12 | 95% Percentile | 12 | 12 | 12 | |
| 10 | 12 | 21 | 12 | 12 | 12 | |
| 10 | 12 | Num. Samples for 90% | 12 | 12 | 12 | |
| 10 | 12 | 36 | | | | |
| 10 | 12 | | | | | |
| 10 | 12 | | | | | |
| 10 | 12 | | | | | |
| 10 | 13 | | | | | |
| 10 | 13 | | | | | |
| 10 | 13 | | | | | |
| 10 | 13 | | | | | |
| 10 | 13 | | | | | |
| 10 | 18 | | | | | |
| 10 | 21 | | | | | |
| 10 | 22 | | | | | |
| 10 | 33 | | | | | |

FIG. 4A

| Center | T-Digests Clusters | | Total Samples | Center Start | Center End | Center End - Center Start | Sample Count |
|---|---|---|---|---|---|---|---|
| | Center | Count | | | | | |
| 0.0001 | 0.5148 | 1 | 1,000,000 | 0.0001 | 0.5148 | 0.5147 | 923,680 |
| 0.0002 | 0.5613 | 1 | Num. for 90% | 0.0002 | 0.5148 | 0.5146 | 923,679 |
| 0.0004 | 0.6045 | 4 | 900,000 | 0.0004 | 0.5148 | 0.5144 | 923,678 |
| 0.0008 | 0.6448 | 11 | | 0.0008 | 0.5148 | 0.5140 | 923,674 |
| 0.0013 | 0.6817 | 26 | | 0.0013 | 0.5148 | 0.5135 | 923,663 |
| 0.0023 | 0.7156 | 76 | | 0.0023 | 0.5148 | 0.5125 | 923,637 |
| 0.0035 | 0.7469 | 123 | | 0.0035 | 0.5148 | 0.5113 | 923,561 |
| 0.0050 | 0.7745 | 220 | | 0.0050 | 0.5148 | 0.5098 | 923,438 |
| 0.0072 | 0.7987 | 542 | | 0.0072 | 0.5148 | 0.5077 | 923,218 |
| 0.0109 | 0.8186 | 1,382 | | 0.0109 | 0.5148 | 0.5039 | 922,676 |
| 0.0170 | 0.8354 | 3,389 | | 0.0170 | 0.5148 | 0.4978 | 921,294 |
| 0.0263 | 0.8501 | 7,669 | | 0.0263 | 0.5148 | 0.4885 | 917,905 |
| 0.0402 | 0.8623 | 16,398 | | 0.0402 | 0.5148 | 0.4746 | 910,236 | 90%MCI |
| 0.0598 | 0.8735 | 31,425 | | 0.0598 | 0.5613 | 0.5015 | 921,675 |
| 0.0858 | 0.8864 | 52,505 | | 0.0858 | 0.6045 | 0.5186 | 908,543 |
| 0.1187 | 0.9008 | 77,678 | | | | | |
| 0.1579 | 0.9120 | 100,721 | | | | | |
| 0.2024 | 0.9199 | 115,650 | | | | | |
| 0.2508 | 0.9277 | 119,076 | | | | | |
| 0.3024 | 0.9341 | 114,764 | | | | | |
| 0.3563 | 0.9379 | 100,501 | | | | | |
| 0.4111 | 0.9425 | 80,737 | | | | | |
| 0.4645 | 0.9441 | 59,249 | | | | | |

FIG. 4B

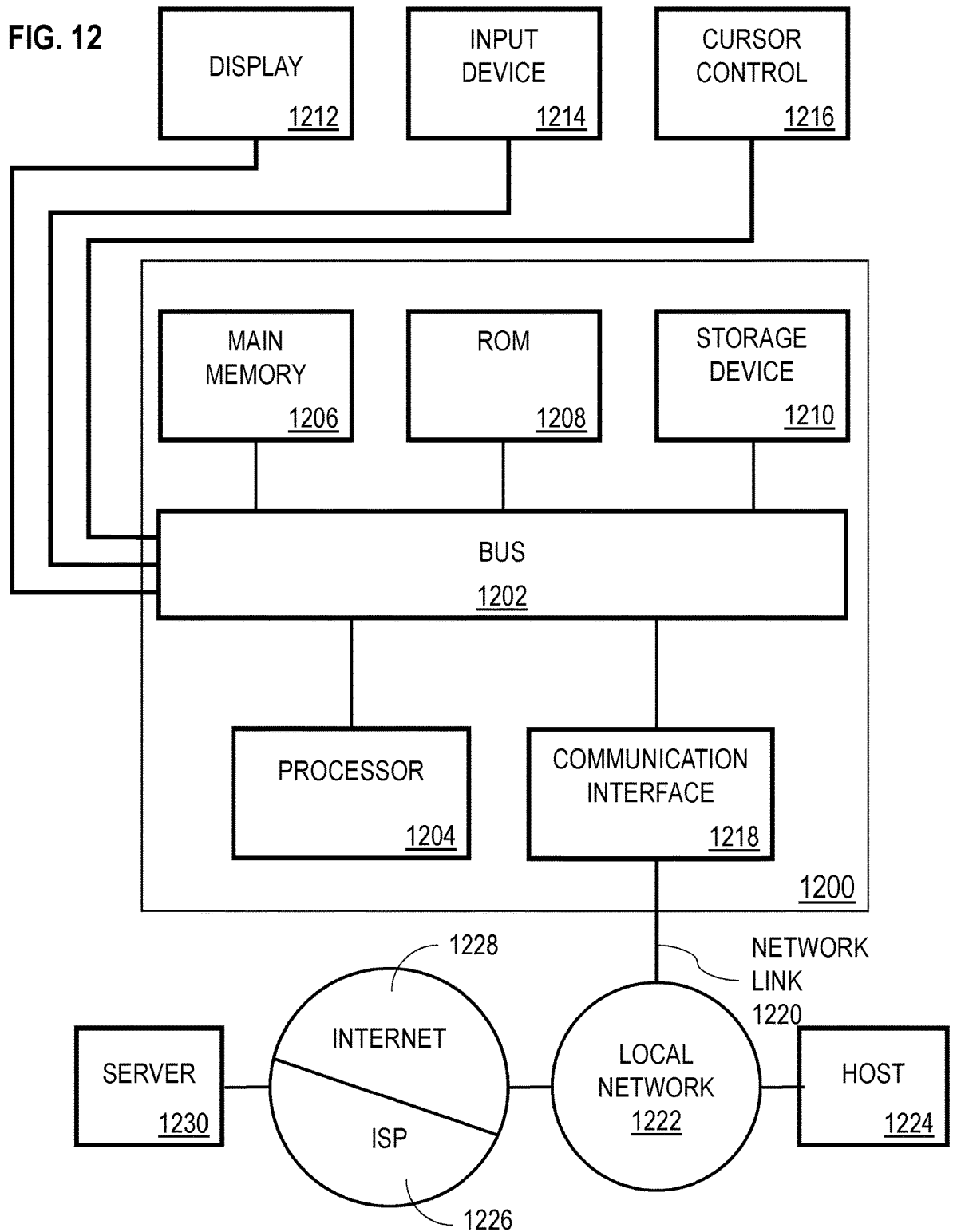

SCALABLE METHODS AND SYSTEMS FOR APPROXIMATING STATISTICAL DISTRIBUTIONS

RELATED APPLICATIONS; INCORPORATION BY REFERENCE

This application is related to U.S. application Ser. No. 16/000,602, titled "METHODS AND SYSTEMS FOR AGGREGATING DISTRIBUTION APPROXIMATIONS", filed Jun. 5, 2018, the entire contents of which are incorporated by reference as if set forth in their entirety.

TECHNICAL FIELD

The present disclosure relates to in optimizations for approximating statistical distributions. In particular, the disclosure relates to in-memory optimizations that provide high scalability within computing systems streaming large amounts of data.

BACKGROUND

A statistical distribution for a data set is a listing or function representing all the possible values in the data set and how often the values occur. Statistical distributions are useful in a wide variety of applications, including machine-learning and resource management applications. One approach to modelling statistical distribution in a computing system is to sort all the data points in a data set from low to high. Rank-based statistics, such as the median or a quantile of interest, may then be determined by interpolating the sorted values or fitting the sorted values to a distribution model. While this approach may provide accurate results, the model does not scale well to large datasets. Sorting and interpolating large numbers of data points involves a significant amount of memory and processing overhead, which may be infeasible within many computing systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4A is a comparison of percentiles with maximum concentration intervals for a given data set;

FIG. 4B illustrates an example approximation of a maximum concentration interval using a set of t-digest clusters in accordance with some embodiments;

FIG. 12 shows a block diagram that illustrates a computer system in accordance with some embodiments.

DETAILED DESCRIPTION

Figure 1:
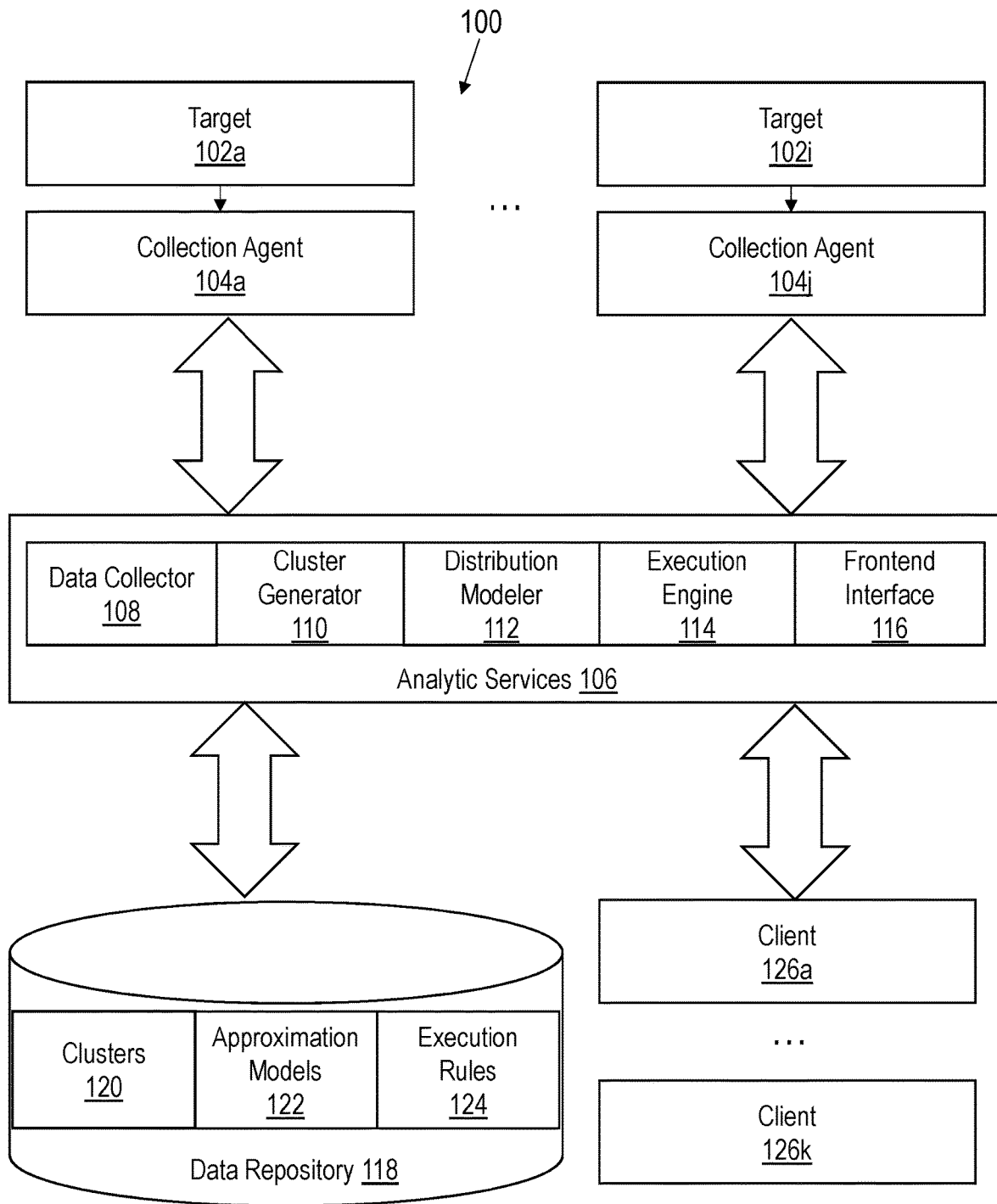
FIG. 1 illustrates an example system architecture for generating and evaluating scalable distribution models, in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. SCALABLE STREAMING FOR DISTRIBUTION CHARACTERIZATION
   3.1 T-DIGEST CLUSTERING FOR STREAMING OPTIMIZATION
   3.2 STREAMING DISTRIBUTION-BASED STATISTICS
4. PIECEWISE APPROXIMATIONS OF DISTRIBUTION FUNCTIONS
   4.1 CLUSTER TRANSFORMATIONS TO PIECEWISE APPROXIMATIONS
   4.2 PIECEWISE APPROXIMATION COMPRESSION
   4.3 CONFIGURABLE COMPRESSION
5. AGGREGATE DISTRIBUTION APPROXIMATIONS
   5.1 DENSE HISTOGRAMS
   5.2 AGGREGATE PIECEWISE APPROXIMATIONS
6. DISTRIBUTION MODEL EVALUATIONS
7. COMPUTER NETWORKS AND CLOUD NETWORKS
8. MICROSERVICE APPLICATIONS
9. HARDWARE OVERVIEW
10. MISCELLANEOUS; EXTENSIONS
   1. General Overview Techniques are described herein for efficiently approximating, modelling, and evaluating statistical distributions within computing systems. The techniques allow for significant reductions in memory and processing overhead incurred by other statistical distribution models. The techniques also allow for increased transferability and better distribution approximation quality than other approximation models.

One approach to calculating approximations of a distribution is to generate a histogram model. Histogram models may approximate a statistical distribution through bins of uniform width or bins with variable width and uniform density. A frequent difficulty with this approach is that the accuracy of the approximation is tightly coupled with the number of bins—more bins generally results in a better approximation. However, the larger the number of bins, the more significant the memory and processing footprint. It may be difficult to determine the ideal number of bins to balance between accuracy and memory consumption.

Another approach to approximating a distribution is through a process referred to as t-digest. This approach approximates the distribution of a data set with a sequence of clusters. The t-digest process generally produces high-fidelity approximations of a data set. However, the number of clusters used to represent the distribution may still be relatively large, which negatively impacts the scalability of this approach. Further, some implementations of t-digest have difficulty handling streaming data. When a sequence of ordered samples are received, one implementation of t-digest is to assign the next sample to one of the tails in the distribution, resulting in a new cluster being added. In this case, the t-digest process stores all samples in the data set. As a result, some implementations of t-digest clustering may yield little to no benefit in terms of memory footprint or transferable representations for certain types of inputs.

The histogram and t-digest approximation approaches may be thought of as constant approximations. In the case of a histogram model, a bin corresponds to different constants that approximate different portions of a distribution. In the case of a t-digest model, the clusters correspond to different constants to approximate different portions of the distribution. In both models, high fidelity approximations are generally achieved with a relatively large number of constants.

In some embodiments, a constant approximation is replaced or transformed to a functional approximation of a distribution. Functional approximations may represent distributions of data sets with significantly fewer data points than constant approximations. A smaller memory footprint generally improves transferability and scalability, allowing for quicker save, transmit and load times.

In some embodiments, a functional approximation is generated by transforming, within volatile and/or non-volatile memory, a set of clusters to a piecewise approximation of a distribution function. Example distribution functions that may be approximated through the transformation include probability density functions (PDFs) and cumulative distribution functions (CDFs). CDF representations may allow for a more accurate and compact approximation as CDFs are generally smoother than PDFs for a given data set. PDF functions may allow for compact and high-quality approximations if a distribution pattern and corresponding fitting function are known beforehand. However, this information may not be readily available for certain applications, such as applications in which the behavior of software and computing hardware metrics are being modeled.

In some embodiments, adaptive piecewise linear approximation (APLA) is used to transform the set of clusters to a piecewise approximation of the distribution function. APLA is a process through which one or more lines, which may vary in size, are fit to a distribution represented by the set of clusters. APLA allows for long, smooth distribution segments to be approximated by a single line. In the case of smooth functions, such as CDFs of computing metrics, APLA approximations may achieve significant levels of compression while maintaining a high level of fidelity.

In some embodiments, piecewise approximations are generated using a multi-pass approach. On a first pass, a threshold number of lines may be fit to a distribution function, which caps the maximum memory footprint to a threshold size. One or more subsequent passes may attempt to simplify the approximation and achieve greater compression by fitting fewer lines. If the quality of the fit deteriorates by more than a threshold, then the fit of the current pass may be discarded, and the previous fit may be retained.

In some embodiments, piecewise approximations are adaptable to streaming data. As new data points are received, the set of clusters and piecewise approximations may be updated to reflect changes in the distribution. Once updated, the new data points do not need to be retained in volatile or non-volatile storage and may be discarded. Thus, storage overhead may be constrained in systems that stream large quantities of data.

In some embodiments, an optimized version of t-digest is used to update the set of clusters. The optimized version of t-digest does not necessarily add a new cluster for each data point when a stream of ordered samples are received. Instead, the t-digest process may merge adjacent clusters when certain conditions are satisfied to prevent new data points in an ordered input from triggering the creation of a new cluster. Additionally or alternatively, clusters may be rebalanced as new data points are received.

In some embodiments, piecewise approximations represent distribution of software and/or computing hardware resource metrics. With a small memory footprint, the piecewise approximation may be quickly loaded and processed to determine behavioral patterns of the resources. For example, queries may be evaluated against the piecewise approximation to determine the median, top, and bottom performance quantiles of resources in a datacenter or cloud environment.

In some embodiments, piecewise approximations for different streams of data are aggregated into a single, distribution model. For example, a cloud service may be supported by several different web servers. Piecewise approximation models may be generated using the metric data collected from each individual web server, where individual piecewise approximation models approximate the CDF of performance metrics for a single web server. An aggregate distribution model may be generated based on the individual piecewise approximation models. The aggregate distribution model may approximate the CDF of performance metrics across multiple web servers.

In some embodiments, generating an aggregate distribution model comprises generating a dense histogram from a set of piecewise approximations. The dense histogram may be used to seed an instance of a t-digest percentile calculator and generate a set of t-digest clusters representing an aggregate distribution function. The set of clusters may then be transformed within volatile and/or non-volatile memory, to a piecewise approximation of an aggregate distribution function. For example, APLA may be used to fit one or more lines to the aggregate distribution function. An aggregate distribution function model may provide estimates of distributions over longer periods of time than a single sample window and/or across different entities, such as across different servers.

In some embodiments, individual and/or aggregate piecewise approximation models are provided to an execution engine. The execution engine evaluates one or more values and/or rules against the piecewise approximation models. Based on the evaluation, the execution engine may trigger alerts and/or other automated action. For example, the execution engine may evaluate performance metrics for a hardware or software resource against the piecewise approximations to determine a performance quantile for the resource. If the performance quantile does not satisfy a threshold, then the resource may be underperforming and/or exhibiting anomalous behavior. In response, an alert and/or auto-remediation action may be triggered on or with respect to the resource.

Some embodiments described in this Specification and/or recited in the claims may not be included in this General Overview section.

2. System Architecture

FIG. 1 illustrates an example system architecture for generating and evaluating scalable distribution models in accordance with some embodiments. As illustrated in FIG. 1, system 100 includes targets 102a-i, collection agents 104a-j, analytic services 106, data store 118, and clients 126a-k. In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Targets 102a-i correspond to hardware and/or software components used to support deployments of a particular resource. Example hardware targets may include host machines, server appliances, network adapters, and storage drives. Example software targets may include listeners, load balancers, virtual machines, middleware, and application instances. A software resource or system in this context may be a multi-tier software application running by use of a variety of hardware and software components. For example, a multi-tier application may include a presentation tier for interfacing with one or more users, an application tier for executing application-specific logic, and a data tier for storing and retrieving data. In other cases, a software resource may be an application or other software component within a single tier of a multi-tier application. For example, the software resource may correspond to a database management system executing in the data tier of a multi-tier application. In other embodiments, a software resource may be a standalone application or other software component. For example, the software resource may be a standalone desktop application.

Collection agents 104a-j collect sample data points from targets 102a-i and provide the deployment parameters to analytic services 106 for subsequent processing. One or more of collection agents 104a-j may be a daemon or background process that executes on the same host as a target. Additionally or alternatively, one or more of collection agents 104a-j may be located on a remote host from a target for which the agent is configured to collect parameters. Although one collection agent is depicted per target, a collection agent may collect parameters from multiple targets or from a single target, depending on the implementation.

Collection agents 104a-j are configured to sample performance metrics from targets 102a-i at periodic intervals. As an example, a collection agent may be configured to sample response times for a target server at one-minute intervals. As another example, a collection agent may be configured to sample CPU utilization rates at one-hour intervals. Additionally or alternatively, other performance metrics may be gathered at the same or different intervals. Examples may include memory throughput, network latency, open sessions, and query execution times.

Analytic services 106 include a set of applications and/or web services that may be invoked to perform clustering and management operations as described further herein. Analytic services 106 generally comprises data collector 108, cluster generator 110, distribution modeler 112, execution engine 114, and frontend interface 116. Each service implements a function or set of functions as described in further detail below. Functions shown as performed by a single service may be executed by multiple services and/or different services, depending on the particular implementation. Additionally or alternatively, functions depicted as being performed by different services may be consolidated to a single service. One or more of the services may be encapsulated into a microservice application and/or a cloud application, such as a software-as-a-services (SaaS) application.

Data collector 108 is communicatively coupled to collection agents 104a-j and receive sample data points collected from targets 102a-i. Data collector 108 may collect data points from one or more collection agents as the data points are collected on a streaming basis. Additionally or alternatively, data collector 108 may collect several data points from one or more collection agents in bulk after several sample intervals have passed.

Collection agents 104a-j send collected data points to data collector 108 over one or more interconnected data communication networks, such as the Internet. Collection agents 104a-j may send the sample data points to data collector 108 using one or more communication protocols. Example communication protocols that may be used include the hypertext transfer protocol (HTTP), simple network management protocol (SNMP), and other communication protocols of the internet protocol (IP) suite.

Cluster generator 110 generates clusters representing distributions of data points collected by data collector 108. Cluster generator 110 may implement a modified version of t-digest that is optimized for streaming data, as described in further detail below in Section 3, titled "Scalable Streaming for Distribution Characterization". In other embodiments, cluster generator may implement other versions of t-digest or other clustering methods that generate clusters as a function of data point distributions.

Distribution modeler 112 transforms cluster representations into a compact, piecewise approximation of a distribution function. Techniques for generating piecewise approximations are described in further detail below in Section 4, titled "Piecewise Approximations of Distribution Functions", and Section 5, titled "Aggregate Distribution Approximations".

Execution engine 114 evaluates rules and requests against distribution models. The piecewise approximations may allow for significant reduction in memory footprint, thereby allowing for fast load and evaluation times by execution engine 114. The compact nature of the piecewise approximation may also allow for a more transferable representation of a distribution. In the event that execution engine 114 is located on a remote, network host, the piecewise approximations may be quickly transmitted via a data communications network. Techniques for evaluating distribution models are described in further detail below in Section 6, titled "Distribution Model Evaluations".

Frontend interface 116 is an interface through which clients 128a-k may invoke or otherwise interact with analytic services 106. Examples of interfaces include a graphical user interface (GUI), a command line interface (CLI), an application programming interface (API), a haptic interface, and a voice command interface. Examples of user interface elements include checkboxes, radio buttons, dropdown lists, list boxes, buttons, toggles, text fields, date and time selectors, command lines, sliders, pages, and forms. A "client" in this context may be a human user, such as an administrator, a client program, or some other application instance. A client may execute locally on the same host as analytic services 106 or may execute on a different machine. If executing on a different machine, the client may communicate with analytic services 106 via one or more data communication protocols according to a client-server model, such as by submitting HTTP requests to invoke one or more of the services and receiving HTTP responses comprising results generated by one or more of the invoked services.

In some embodiments, analytic services 106 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Data repository 118 includes volatile and/or non-volatile storage for storing data that is generated and/or used by analytic services 106. The datasets that are stored include:

Clusters 120 representing the distribution of data points collected from targets 102a-i;

Approximation models 122 transformed from clusters 120 and providing a more compact representation of the distribution of data points collected from targets 102a-i; and Execution rules 124 which are consumed by execution engine 114 and control how execution engine 114 evaluates approximation models 122.

Data repository 118 is any type of storage unit and/or device (e.g., a file system, database, collection of tables, or any other storage mechanism) for storing data. Further, data repository 118 may include multiple different storage units and/or devices. The multiple different storage units and/or devices may or may not be of the same type or located at the same physical site. Further, data repository 118 may be implemented or may execute on the same computing system as one or more other components of system 100 and/or on a separate computing system. Data repository 118 may be communicatively coupled to analytic services 106 via a direct connection or via a network.

Additional embodiments relating to computer networks and microservice applications are described below in Section 7, titled "Computer Networks and Cloud Networks", and Section 8, titled "Microservice Applications", respectively.

3. Scalable Streaming for Distribution Characterization

Many applications rely on the ability to determine distribution-based statistics in an online fashion. An online algorithm or process, in this context, is one that has the ability to process inputs in the order provided, without having the entire input available from the start. In streaming applications, for instance, the input values may be received in a continuous or periodic basis. For example, metric values may be sampled from targets 102a-i at periodic intervals. An online process may estimate quantiles and other distribution-based statistics even as the input data continues to be streamed.

As previously mentioned, one approach to computing rank-based statistics is to sort the sampled data values in memory. However, this approach is often not feasible for applications processing large amounts of data. For example, an application that samples CPU performance at one-minute intervals results in 1,440 data points per day. Over the course of a month, approximately 43,800 data points are created. If the application is sampling CPU performance on several targets and/or other performance metrics on the same targets, then the number of data points may quickly approach one million or more. A data structure storing a significant number of data points would inhibit many online applications from computing distribution-based statistics in a performant manner. It is generally preferable to maintain only a small data structure in memory.

Another online approach to computing distribution-based statistics is referred to as t-digest. This approach generates a set of clusters, referred to herein as t-digest clusters, that may be used to compute approximations of distribution-based statistics while allowing for controllable accuracy. Maintaining a set of t-digest clusters requires significantly less memory than retaining thousands or more samples in a data set.

3.1 T-Digest Clustering for Streaming Optimization

A t-digest cluster, as used herein, refers to a set of clusters that approximate or represent a distribution of samples. The manner in which the t-digest clusters are generated may vary from implementation to implementation. Examples of different processes for generating t-digest clusters are provided below, although other techniques may also be used. In some embodiments, a t-digest process, which may be implemented by cluster generator 110, receives a set of sample data points and approximates the distribution of the samples with a set of clusters. Rank-based statistics, such as percentiles, may be calculated by analyzing the density of a set of t-digest clusters.

In some embodiments, generating a set of t-digest clusters comprises maintaining a list of centroids, denoted $C=[c_1 \ldots c_n]$ where n corresponds to the total number of centroids. A mean and a count value are stored for each centroid. The set of centroids may initially be maintained as an empty list. The mean and count value for the set of centroids may be updated as new samples are received.

In some embodiments, the number of samples assigned to a cluster is constrained to an upper limit defined by $dp(1-p)n$, where d is a configurable parameter that controls the number of clusters that are used to approximate a distribution, p is the calculated fraction of data up to the centroid in question (also referred to as the quantile for the approximate mean of the centroid in question), and n is the current number of observed samples. A larger value for d allows more samples to be assigned to a cluster, which may result in fewer clusters and a more compact representation. A smaller value allows for more clusters and a more accurate approximation of the distribution. Thus, the value d may be referred to as the compression factor. The value p may be approximated for centroid $c_i$ by summing the weights for all of the centroids before $c_i$ as follows:

$$p(c_i) = \frac{c_i \cdot count/2 + \sum_{j<i} c_j \cdot count}{\sum_j c_j \cdot count}$$

The above sum may be computed quickly by maintaining the centroids in a balanced binary tree, where the sums of each sub-tree are stored.

The upper limit constraint defined above results in the creation of sparser and sparser clusters at the tails of the distribution because the product p(1–p) approaches 0 when p approaches 0 and 1. A set of t-digest clusters may thus consist of many, small clusters near the tails and few, large clusters near the middle of the sequence. A "small" cluster in this context refers to a cluster to which relatively few sample data points have been assigned and a "large" cluster is one where several sample data points have been assigned. It is noted that assigning the data point to a cluster causes the mean and count value for the cluster to be updated. The actual data point does not need to be retained in memory and may be discarded. A small and large cluster may consume the same amount of memory even though there may be a large disparity in the number of data points assigned to each cluster. The upper limit constraint allows percentiles to be estimated with a high degree of accuracy near the tails.

The use of an upper limit constraint presents challenges for some inputs. If the sample values are input in ascending or descending order, then the cluster set C may include as many centroids as input samples. This result occurs because, for each new input sample, p(1–p) will be approximately 0. One approach to prevent this deficiency is to pause the clustering process when a threshold number of clusters have been created. The t-digest clustering process may then be recursively applied to the centroids after randomizing the order of the centroids. An example process for implementing this approach is summarized below. An alternative implementation that is better optimized for streaming applications is also provided.

Figure 2A:
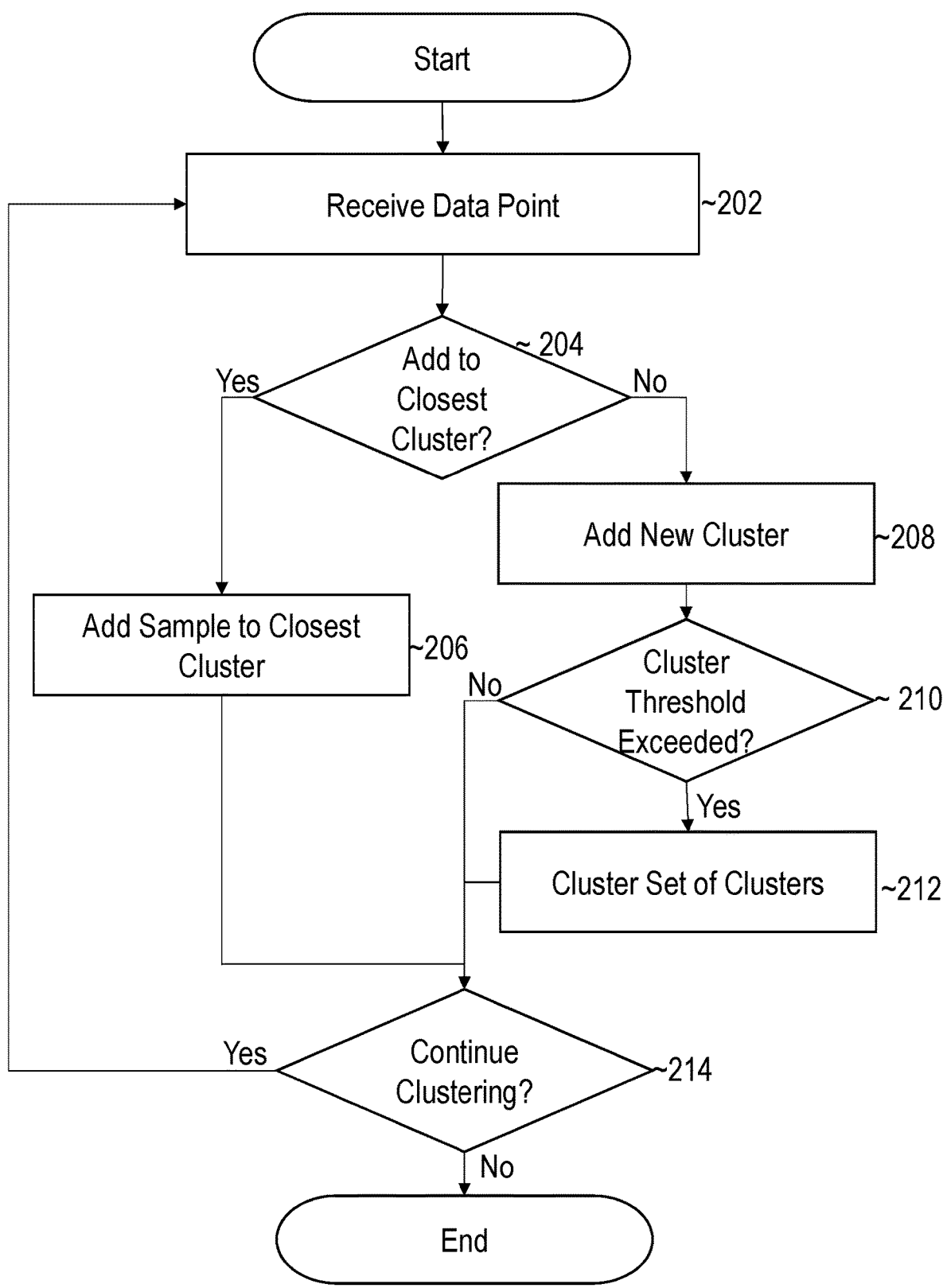
FIG. 2A illustrates an example set of operations for approximating a distribution of samples with a set of clusters in accordance with some embodiments.

FIG. 2A illustrates a set of operations for approximating a distribution of samples with a set of clusters, where clustering is recursively applied in accordance with some embodiments. The set of operations comprises receiving a sample data point (Operation 202). For example, the sample data point may be a performance metric collected from a target resource at a sampling interval. Sample data points may be input in an ordered or unordered sequence.

Responsive to receiving the sample data point, the t-digest process determines whether the sample can be added to the closest cluster (Operation 204). The determination may be made based on the upper limit constraint as defined above. If the closest cluster can accommodate an additional data point, then the process continues to operation 206. If adding the data point to the closest cluster would cause the total number of data points assigned to the closest cluster to violate the upper limit constraint, however, then the process continues to operation 208.

If the t-digest process determines that the closets cluster can accommodate the received sample data point, then the sample data point is added to the cluster (Operation 206). Adding the sample data point includes updating the mean using the sample value and/or a weight associated with the sample value. The cluster is also updated by incrementing the count of the total data points assigned to the cluster. Once the cluster has been updated, the sample data point does not need to be retained and may be overwritten or otherwise discarded from memory.

If the upper limit constraint is violated, then a new cluster is added (Operation 208). The new cluster may be centered on the sample data point. For example, a sample value may include a measured performance metric value, such as a CPU utilization rate of 90% or a server response time of 10 milliseconds (ms). The sample value may be assigned as the mean value for the new cluster centroid. The new cluster centroid may also be assigned a member count value of one as only one data point has been assigned to the cluster at this stage.

If a new cluster is added, then the t-digest process determines whether the number of clusters exceeds a threshold (Operation 210). If the number of clusters exceeds a threshold, then the process continues to operation 212. Otherwise the process continues to operation 214. The threshold may be used to prevent the number of clusters from reaching an excessive number, such as if a new cluster is added for each new sample value in an ordered set. The threshold may vary from implementation to implementation.

If the number of clusters has exceeded the threshold, then the t-digest process recursively clusters on the set of clusters C (Operation 212). The cluster centroids may be randomly ordered and fed as input into the clustering algorithm. This operation may include assigning multiple centroids to a cluster to create a new centroid, effectively reducing the number of clusters in cluster set C.

After the data point has been added to an existing or new cluster, the t-digest process may determine whether to continue clustering. (Operation 214). For example, streaming applications may periodically receive new data points at sample intervals. In other cases, an input may include several data points that are clustered one by one. If there are more data points to cluster, then the process returns to operation 202 and repeats for the next sample data point. Otherwise, the clustering process may end.

The t-digest process above allows for a compact distribution approximation even with ordered inputs. However, operations 210 and 212 may involve a significant amount of processing overhead as the clustering process is performed twice, the first time for the newly received data point and the second time on a relatively large number of cluster centers. Another challenge with this approach is the threshold which restricts the total number of clusters to a predefined maximum may open the clustering process to instabilities. The instability arises because the cost of rebalancing comes in bursts and is not uniformly distributed across all operations. Further, changing the maximum threshold may have a significant performance impact. Small maximum numbers of clusters result in frequent rebalancing, which allows for a more compact abstraction but slows down performance. A large maximum number of clusters results in infrequent rebalancing, which reduces processing overhead but increases memory overhead. These tradeoffs reduce the ability to accommodate ordered samples in streaming applications in a performant manner.

Figure 2B:
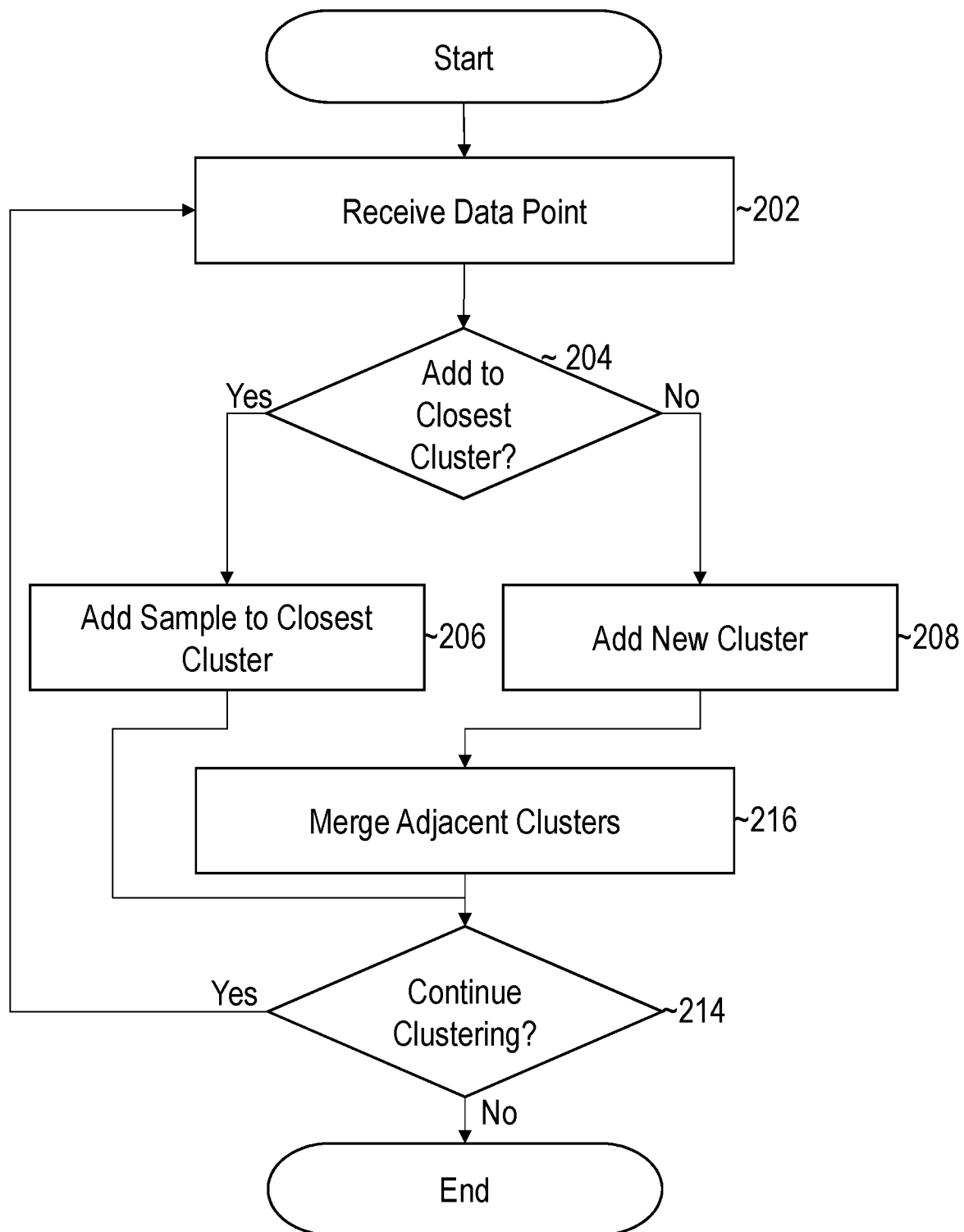
FIG. 2B illustrates an example set of operations for approximating a distribution of samples with a set of clusters in a manner that is optimized for streaming applications in accordance with some embodiments.

FIG. 2B illustrates an example set of operations for approximating a distribution of samples with a set of clusters in a manner that is optimized for streaming applications in accordance with some embodiments. In this process, a maximum threshold is not used to trigger periodic rebalancing to accommodate for sorted samples, such as summarized above with reference to operation 210 and operation 212. Rather, if a new cluster is added, then the modified version of the t-digest process performs a one-pass merge of adjacent clusters (Operation 216). In some embodiments, adjacent clusters are merged only if the result would not violate the upper limit defined by $dp(1-p)n$. Merging two clusters may generally comprise creating a centroid for a new cluster. The centroid for the new cluster has a member count equal to the sum of the member counts of the merged clusters. The centroid also has a mean value that is computed as a function of the mean values of the merged clusters. The centroids for the merged clusters may be discarded and are not included in the final cluster set C.

The optimized version of the t-digest process above was found to be capable of maintaining accuracies with average approximation errors below 1% for random, ascending, descending, and banded ordering. The optimized t-digest process was also found to be capable of processing at least tens of millions of samples per minute, allowing for integration into applications streaming large data sets.

Figure 3:
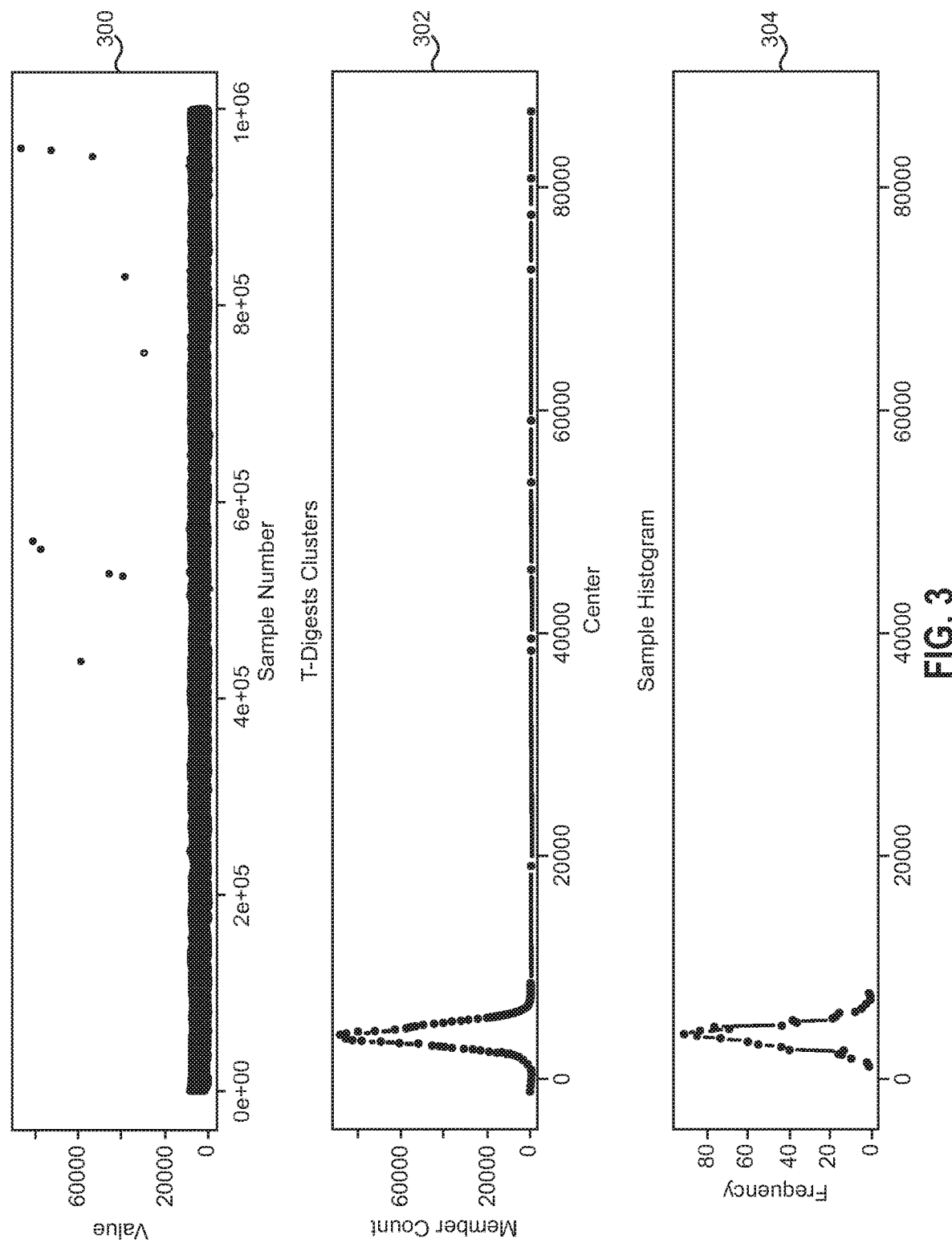
FIG. 3 illustrates the results of approximating the distribution of one million samples of data using t-digest clustering and sampling.

FIG. 3 illustrates the results of approximating the distribution of one million samples of data using t-digest clustering and sampling. Chart 300 plots the distribution of data samples. Chart 300 depicts ten outlier values that have a value of greater than 20,000. The remaining samples fall below this value. Chart 302 depicts a set of t-digest clusters. As can be seen, there are significantly fewer than one million data points in the distribution approximation. The t-digest process is able to capture singleton clusters at extreme tails. Chart 304 depicts a histogram generated from retaining a random sample of the incoming data points. The sample histogram provides an accurate approximation but smoothes out the information about outlier values.

As illustrated in FIG. 3, t-digest clustering retains accurate information at the tail ends of the distribution. This information may be useful in many applications. For example, hardware and software metrics may maintain a steady-state base signal. Periodically, a significant outlier may be observed that is well outside the base range. With the sample-based histograms, if the number of deviant patterns is not substantial, the likelihood of one being selected for retention is low. In chart 304, for example, the sampled distribution does not contain a single of the ten outlier values. By contrast, the t-digest approximation depicted in chart 302 captures the outlying values while maintaining a relatively low memory footprint.

3.2 Streaming Distribution-Based Statistics

The t-digest clustering process may be integrated into applications that stream distribution-based statistics. For example, the CDF defined as $F_X(x)=\int_{-\infty}^{x} f_X(\alpha)d\alpha$ represents the probability that the random variable X takes on a value less than or equal to x. The CDF for a given value of x may be approximated using the set of t-digest clusters by summing the contribution of the uniform distributions centered at each centroid.

As another example, the set of t-digest clusters may be used to compute a trimmed mean. A trimmed mean refers to the mean value after discarding parts of a probability distribution. For example, the trimmed mean for the percentile range of interest, denoted $P=[p_0, p_1]$, may be computed as the weighted average of the means of centroids that have percentiles within the range of interest. The means of centroids above or below the range of interest may be discarded and are not used in the computation.

As another example, the set of t-digest cluster may be used to compute maximum concentration intervals (MCIs). MCI values may be useful in applications in which samples are asymmetric and tightly grouped, which is the case for many hardware and software metrics. FIG. 4A is a comparison of percentiles with MCIs for a given data set. The 90% interval for samples 400 is symmetric and is calculated to be 10-21, which is the range between lower 5% percentile 402 and upper 5% percentile 404. In comparison, the MCI returns the smallest interval that produces 90% in coverage, which is asymmetric in this example. Table 406 shows different possible ranges that produce 90% in coverage. The 90% MCI is selected as 10-13 since these values cover the narrowest region that contains 90% of samples 402.

The optimized t-digest process may be used to stream MCI values. As previously indicated, the optimized t-digest process is able to process tens of millions of samples per minute, allowing for large data sets to be approximated quickly. MCI values may also be computed and streamed quickly by returning the min-max cluster center that covers at least the prescribed number of samples. For example, FIG. 4B illustrates an example approximation of an MCI value using a set of t-digest clusters. Table 408 depicts the set of t-digest clusters, where each cluster stores a mean value (the center) and a count. Table 410 depicts the range of clusters that cover more than 90% of the sample values. The 90% MCI is selected as 0.0402-0.5148 because this covers the narrowest region, which is determined as the difference between the center start and the center end.

In the example provided above, the MCI was computed by returning the min-max cluster center that covered the narrowest range. The returned result is an approximate range and may not be exact depending on the cluster centroids. Other implementations may estimate the distribution of the samples within the cluster and use the estimate to generate ranges that produce the exact coverage.

As illustrated above, the set of t-digest clusters allows for the calculation of distribution-based statistics, including MCIs, for large numbers of samples without requiring all samples for the calculation. Thus, the t-digest clusters allow for complex computations to be performed with significantly less memory and processing overhead.

4. Piecewise Approximations of Distribution Functions

In some embodiments, piecewise approximation models are used to form a compact representation of a distribution function. A piecewise approximation may comprise a set of one or more pieces, where each piece is a functional representation of a segment of the distribution. For example, a piecewise linear approximation may comprise a set of lines that represent different segments of the distribution. A single piece may cover segments of a distribution represented by several clusters. As a result, a piecewise approximation may have a much lower memory footprint then a cluster approximation of a distribution function.

In some embodiments, piecewise approximations are generated by fitting pieces to different segments of a distribution. For example, linear regression may be used to fit a line to one or more segments of a distribution function. Additionally or alternatively, polynomial regression may be used to fit a polynomial function to one or more segments. Thus, a piecewise approximation may comprise one or more linear and/or polynomial pieces approximating different segments of a distribution function.

A process for generating piecewise approximations may be adaptive by fitting pieces to segments of varying lengths.

For example, adaptive piecewise linear approximation (APLA) is a process through which lines are fit to segments of varying lengths. A line fit to one segment may thus represent a greater or lesser portion of a distribution function than a line fit to another segment. In other embodiments, lines may cover segments of equal lengths, although non-adaptive approaches may lead to less accurate approximations.

An APLA process may automatically partition a distribution function into segments based one or more function characteristics, such as changes in slope between areas of the function. A region of the distribution function with a slope that does not change or that changes very slowly may be accurately approximated by a linear function. As a result, the partition points may be selected to keep the region in the same segment. On the other hand, regions of a distribution function that have significantly different slopes may benefit from being fitted with different lines. Thus, a distribution function may be partitioned at points where the largest changes in slope are detected.

Piecewise approximations may be generated for different types of distribution function, including PDFs and CDFs. A CDF for a set of hardware and/or software resource metrics is generally smoother than a PDF for the same metrics. Therefore, the CDF may generally be approximated with fewer pieces, allowing for a smaller memory footprint. As previously described, a CDF approximation may be determined from a set of t-digest clusters. The subsections below describe example implementations for transforming a set of clusters into a piecewise approximation.

4.1 Cluster Transformations to Piecewise Approximations

In some embodiments, the process of generating a piecewise approximation models includes a cascade of approximations of the original distribution of a data set. For example, an initial approximation may be generated via the t-digest clustering process previously described. A piecewise approximation process, which may be implemented by distribution modeler 112, may receive a set of t-digest clusters as input and output a piecewise approximation. Thus, the piecewise approximation may approximate another approximation of a distribution.

Figure 5A:
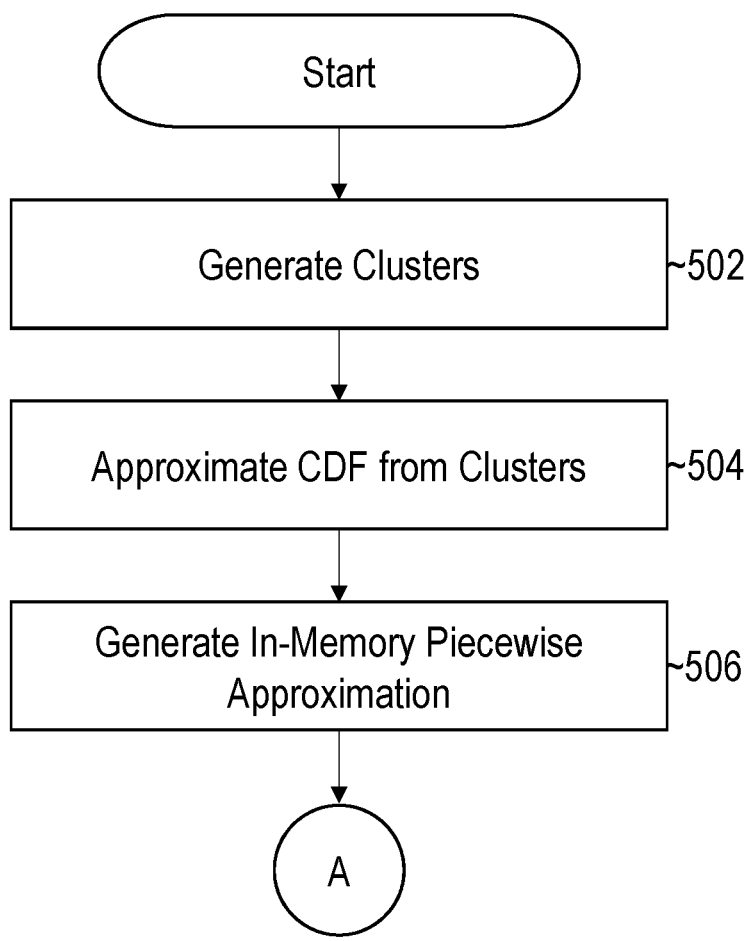
FIG. 5A illustrates an example set of operations for generating a piecewise approximation of a distribution function in accordance with some embodiments.

FIG. 5A illustrates an example set of operations for generating a piecewise approximation of a distribution function in accordance with some embodiments. The set of operations includes generating a set of clusters to approximate a data set (Operation 502). For example, a set of t-digest clusters may be generated as previously described. Thus, each cluster may have a centroid and a member count.

The set of operations further includes approximating a CDF based on the set of clusters (Operation 504). A CDF may be defined as $F_X(x) = \int_{-\infty}^{x} f_X(\alpha) d\alpha$ where X is a random variable, x is a given value, and $f_X(\alpha)$ is the PDF. The CDF gives the probability that X takes on a value less than or equal to x. The CDF for a for a given value of x may be approximated from the set of t-digest clusters by summing the contribution of the uniform distributions centered at each centroid.

The set of operations further includes generating an in-memory piecewise approximation (Operation 506). For example, APLA may be used, as previously described, to recursively fit a specified number of lines to different segments of the approximated PDF. Additionally or alternatively, polynomial fits may be performed for one or more segments.

Piecewise approximations allow cluster approximations of a distribution to be further compressed. The number of clusters in a t-digest approximation of resource metric values may be relatively large, including dozens or even hundreds of clusters. A balanced binary tree storing a list of t-digest centroids and member counts with better than 1% accuracy generally has a memory footprint of a few kilobytes (kB). A cluster approximation with 0.1% accuracy generally has a memory footprint of 20 kB or more. By comparison, a six-line APLA CDF approximation has a memory footprint of approximately 640 bits, which is approximately the same size as a ten-bin uniform width histogram.

Piecewise approximations may be generated near instantaneously when cascaded with optimized t-digest approximations. Initial tests on data sets with one million data points result in in-memory piecewise approximations in 1 ms or less. Initial tests on data sets with one million data points also found that APLA CDF approximations were up to 48% more accurate than ten-bin uniform width histograms.

4.2 Piecewise Approximation Compression

In some embodiments, piecewise approximations are further compressed using a multi-pass process. On a first pass, a threshold number of lines may be fit to a distribution function, which caps the maximum memory footprint to a threshold size. One or more subsequent passes may attempt to simplify the approximation and achieve greater compression by fitting fewer lines. If the quality of the fit deteriorates by more than a threshold, then the fit of the current pass may be discarded, and the previous fit may be retained.

Figure 5B:
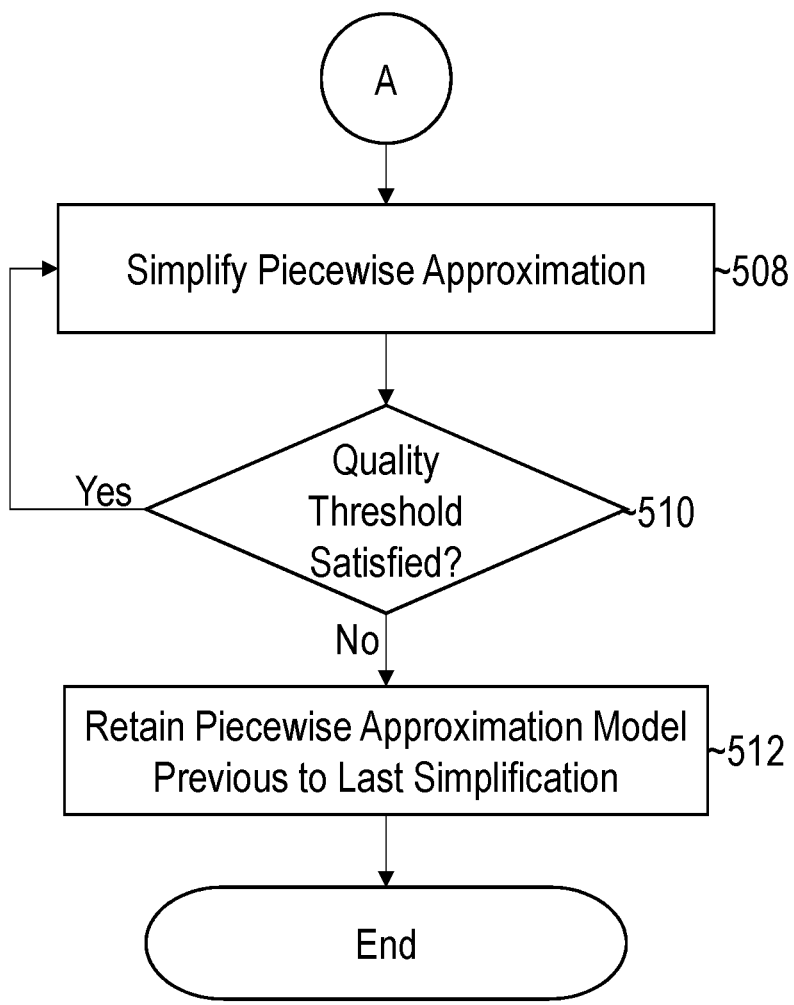
FIG. 5B illustrates an example set of operations for compressing a piecewise approximation in accordance with some embodiments.

FIG. 5B illustrates an example set of operations for compressing a piecewise approximation in accordance with some embodiments. The set of operations includes merging two or more segments of the piecewise approximation together (Operation 508). Segments may be chosen for merging based on adjacency and differences in slope. For example, adjacent segments with smallest difference in slopes may be chosen to be merged together. The adjacent segments then become one segment. Linear or polynomial regression may be used to fit a new function/piece to the merged segment.

When segments are removed, there may be a deterioration in the quality of the fit. To prevent oversimplification, the set of operations includes determining whether the quality of the fit satisfies a threshold (Operation 510). In some embodiments, the sum of the squared error of the fit is compared to a threshold percentage. A threshold of 200% was tested and found to maintain an accuracy rate of within 1% of the original piecewise approximation with a median 45% smaller footprint. However, different thresholds may vary from implementation to implementation. If the quality of the fit satisfies a threshold, then the process returns to operation 508 to further compress the piecewise approximation by merging additional segments. Otherwise, the process continues to operation 512

If the quality of the fit does not satisfy the threshold, then the process retains the piecewise approximation previous to the last merge (Operation 512). For example, a piecewise approximation may start with six linear fits to a CDF for a set of resource metrics. The piecewise approximation may be simplified by merging two of the linear fits together, resulting in a piecewise approximation consisting of five lines. If the quality satisfies the threshold, then the piecewise approximation may be further simplified to four lines. If the quality does not satisfy the threshold, then the six-line approximation may be returned.

Figure 6:
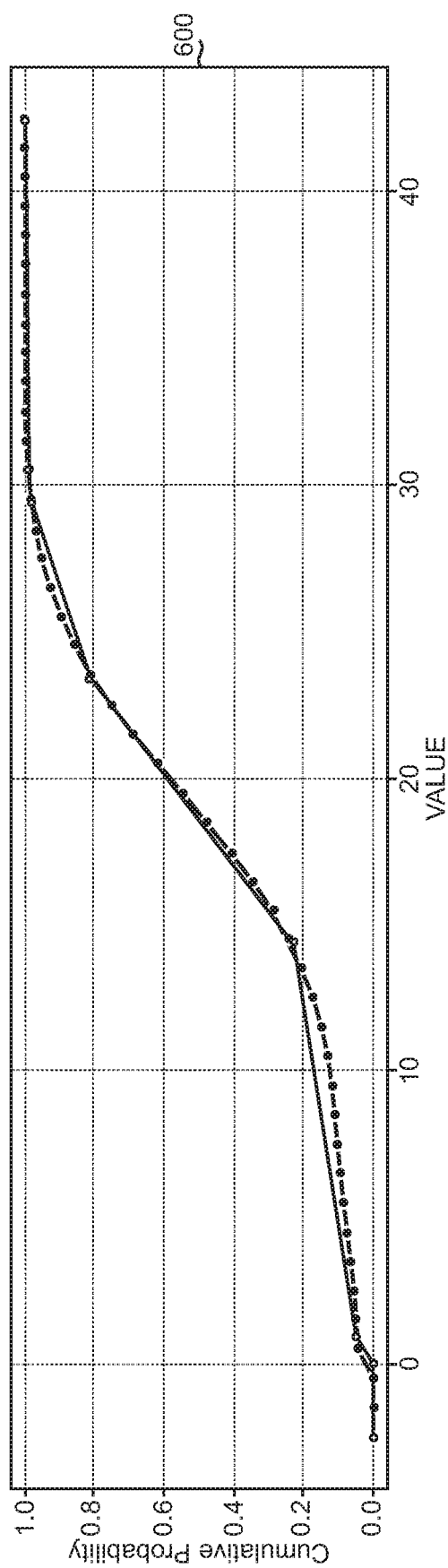
FIG. 6 illustrates an example result of simplifying a piecewise approximation in accordance with some embodiments.
Figure 6:
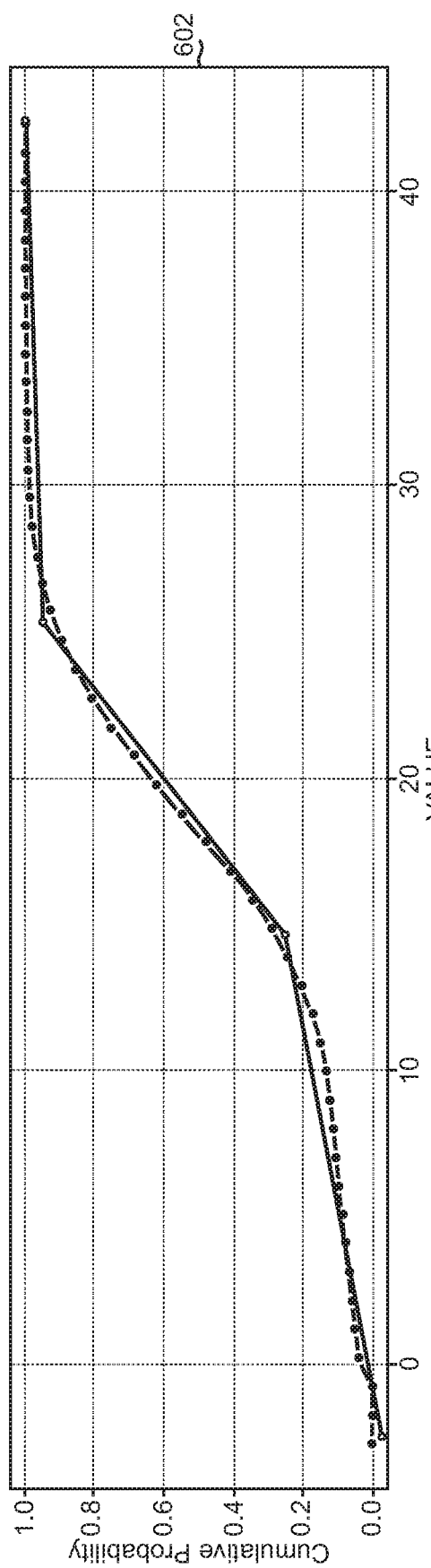

FIG. 6 illustrates an example result of simplifying a piecewise approximation in accordance with some embodiments. Chart 600 depicts a first piecewise approximation overlaid on the approximated CDF. The piecewise approximation in this example is an APLA approximation for six lines. A six-line approximation has a memory footprint of 640 bits, which is approximately the same as a ten-bin uniform width histogram. A six-line APLA was found to provide relatively accurate approximations for smooth CDF approximations of resource metrics. However, the number of prescribed lines fit in the first approximation may vary from implementation to implementation.

Chart 602 depicts the piecewise approximation that is retained through the multi-pass compression process. The piecewise approximation is reduced to three lines instead of six. The three-line approximation has a memory footprint of approximately 320 bits. Thus, the compressed piecewise approximation provides a similar quality fit with a 50% smaller memory footprint.

4.3 Configurable Compression

In some embodiments, one or more compression parameters are configurable, either automatically or by an end user. The compression parameters may be configurable at one or more of the following phases:

Generating a cluster approximation;
Transforming the cluster approximation into a piecewise approximation; and/or
Simplifying the piecewise approximation.

In some embodiments, a compression phase may be toggled on and off. For example, a user may disable the last phase of compression. In response, the piecewise approximation is not simplified once generated. As another example, the user may disable the last two phases of compression. In this example, only the cluster approximation is generated, and the cluster approximation is not transformed into a piecewise approximation.

In some embodiments, a compression parameter may include a desired memory footprint. For example, a user may request that the distribution approximation be no larger than 500 bits. The process may then pass through the above phases of compression through cascading approximations until the resulting approximation satisfies the threshold memory footprint.

In some embodiments, a compression parameter may include a threshold accuracy. For example, a user may request that the approximation have an error of less than 10% from the original distribution. The process may then pass through the above phases of compression to find the approximation with the smallest memory footprint that satisfies the accuracy threshold.

The example compression parameters given above are global in that the compression parameters apply across different phases of the cascading approximations. Additionally or alternatively, local parameters may be configurable. A local compression parameter is one that applies to only a single phase of compression. Example local compression parameters include the compression factor d, which controls the level of compression for the t-digest clusters as previously described. A higher compression factor generally leads to fewer clusters and a smaller memory footprint. A user may adjust the compression factor to achieve the desired balance between memory footprint and accuracy.

Another example of a local compression parameter, which may be configurable, is the prescribed number of lines that are fit during an APLA approximation. A higher number of lines increases the memory footprint of the APLA approximation. A default value may be used for the initial approximation, although the default may be changed. In other cases, the default value may be selected based on a desired memory footprint for the piecewise approximation. For example, a default value of six may be selected if the threshold memory footprint is 620 bits. Other default values may also be selected, depending on the particular implementation.

Additionally or alternatively, the quality threshold for the piecewise approximation simplification may be a configurable, local compression parameter. A higher SSE tolerance threshold may be selected to achieve greater levels of compression. Conversely, a lower SSE tolerance threshold may be selected to increase the accuracy of the approximation.

5. Aggregate Distribution Approximations

The techniques described above may be used to generate piecewise approximations for several individual streams of data. For example, a cloud service may include several web servers that are deployed in one or more datacenters. Performance metrics may be collected at sample intervals from each of the individual servers. A piecewise approximation may be generated for each stream of performance metrics. The result is a set of piecewise approximations, where each piecewise approximation estimates the distribution of performance metrics on a different server.

Individual piecewise approximations are useful to analyze performance with respect to a corresponding resource. For example, a piecewise approximation may be generated to approximate the distribution of page load times for web pages accessed through a server. Queries may be evaluated against the piecewise approximation to identify distribution-based statistics, such as which page load times are in the $99^{th}$ percentile for a given server, what the median page load time on the server is, or what a trimmed mean page load time is for the server between a specified percentile range.

Some applications may utilize aggregate distributions in addition or as an alternative to distributions on individual resources. For example, a cloud management service may compare performance across multiple servers in a cloud environment based on an aggregate distribution of server response times. Queries may be evaluated against an aggregate distribution approximation to identify distribution-based statistics, such as which response times are in the $99^{th}$ percentile across all servers, what quantile the median response time of one server is relative to the aggregate distribution, and which resources perform in the lowest percentile.

Aggregate distributions may also be used to combine piecewise approximations from different windows of time for the same resource. For example, one piecewise approximation may represent the distribution of active database sessions on a database server for one week. One or more separate piecewise approximations may represent the distributions of active database sessions on the database server for different weeks. An aggregate distribution model may be generated to approximate the distribution of database sessions on the database server across all observed weeks.

In some embodiments, distribution modeler 112 generates an aggregate distribution approximation based on a plurality of piecewise approximations. Distribution modeler 112 may approximate an aggregate distribution via dense histograms, t-digest clusters, and/or aggregate piecewise approximation models. Techniques for combining the piecewise approximations into an aggregate distribution approximation model are described further in the subsections below.

5.1 Dense Histograms

In some embodiments, distribution modeler 112 generates a set of dense histograms from a set of input piecewise approximations. A dense histogram includes a set of bins representing different ranges of values within a distribution. For example, a dense histogram representing a distribution of server response times may include the following bins: 0-1 ms, 1-3 ms, 3-8 ms. Different bins may have the same of varying widths depending on the range of values covered.

A bin in a dense histogram is associated with a height value, which is proportional to an approximated frequency that a value falls within the range of values represented by the bin. For example, if it is approximated that the response time for 300,000 samples is 1 ms or less, then the bin 0-1 ms may have a height of 300,000. In some embodiments, the height may be converted to a percentage. In the preceding example, if there were a total of 1 million samples, then 300,000 samples corresponds to 30% of the total samples. A height of 30% of a maximum may then be assigned to the bin.

In some embodiments, bins are constructed based on the distinct start and end points of a set of piecewise approximations. The start and end points may serve as the edges of the histogram bins. The height of the bins may then be computed as a function of the set of piecewise approximations that are being aggregated.

Figure 7:
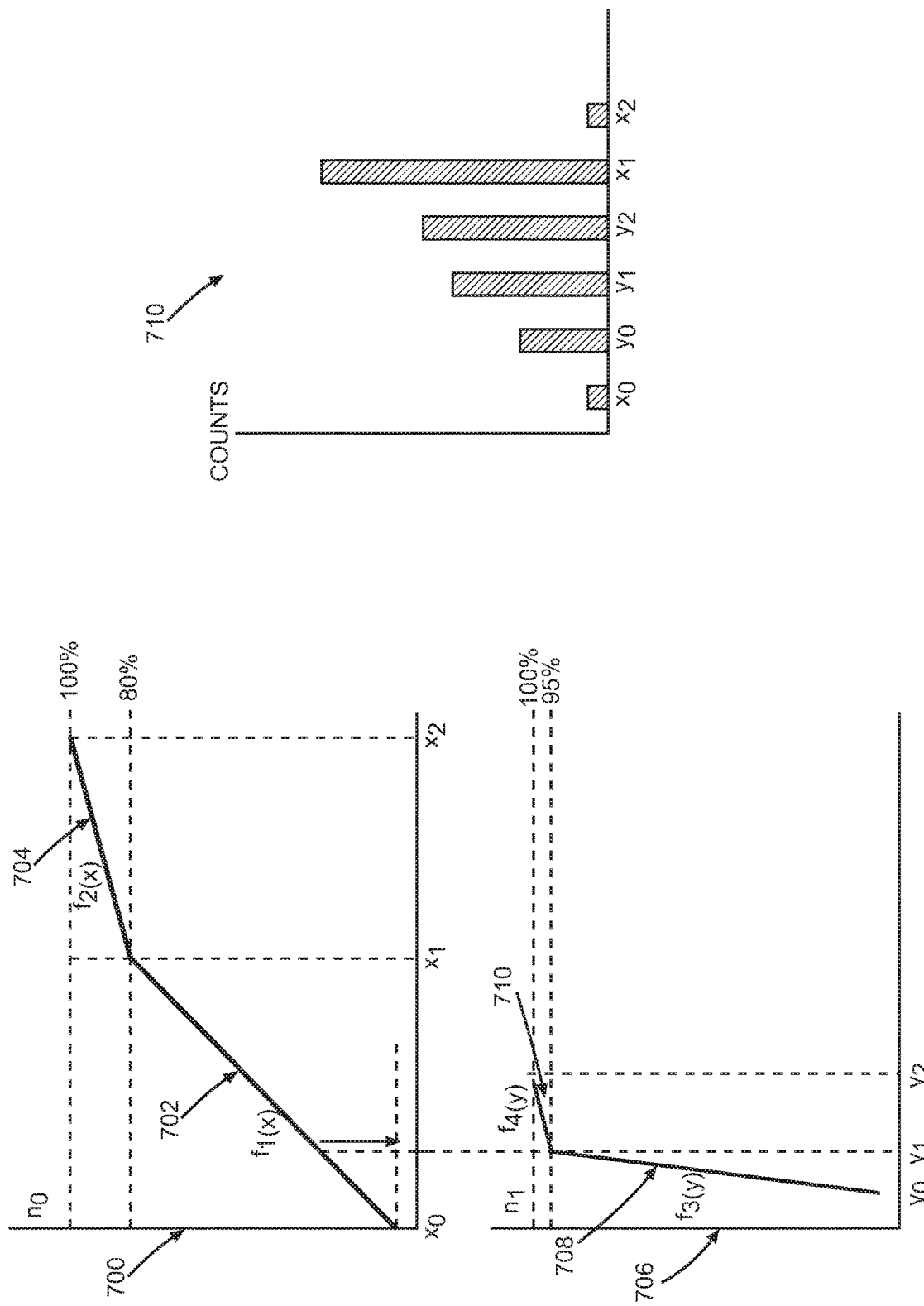
FIG. 7 illustrates an example set of dense histograms that are generated from a set of piecewise approximations in accordance with some embodiments.

FIG. 7 illustrates an example set of dense histograms that are generated from a set of piecewise approximations. Chart 700 depicts a first piecewise approximation with two pieces: line 702 and line 704. Chart 706 depicts a second piecewise approximation which also has two pieces: line 708 and line 710. The piecewise approximations have the following start and end points:

Line 702, represented as $f_1(x)$, starts at $x_0$ and ends at $x_1$;
Line 704, represented as $f_2(x)$, starts at $x_1$ and ends at $x_2$;
Line 708, represented as $f_3(y)$, starts at $y_0$ and ends at $y_1$;
Line 710, represented as $f_4(y)$, starts at $y_1$ and ends at $y_2$.

Chart 712 depicts an example dense histogram representation that is generated from the set of piecewise approximations, in accordance with some embodiments. The edges of the bins are selected from a combination of the start and endpoints of the different piecewise approximations. For example, a first bin may be defined from 0 to $x_0$, a second bin from $x_0$ to $y_0$, a third bin from $y_0$ to $y_1$, a fourth bin from $y_1$ to $y_2$, a fifth bin from $y_2$ to $x_1$, a sixth bin from $x_1$ to $x_2$.

In chart 712, the height of each bin represents an approximate count of sample data points that fall within the corresponding range of values. The count value may be determined as a function of the piecewise approximations being aggregated. For example, the height of the first bin is computed as $f_1(x_0)*n_0$ where $f_1(x_0)$ is the approximate cumulative distribution up to $x_0$ of the first piecewise approximation and $n_0$ is the total number of data points in the first piecewise approximation. The height of the second bin is computed as $f_3(y_0)*n_1+(f_1(y_0)-f_1(x_0))*n_0$ where $f_3(y_0)$ is the approximate cumulative distribution up to $y_0$ of the second piecewise approximation, $n_1$ is the total number of data points in the second piecewise approximation, and $f_1(y_0)$ is the approximate cumulative distribution up to $y_0$ of the first piecewise approximation. The cumulative distribution already accounted for in the first bin, $f_1(x_0)*no$, is subtracted to obtain the final count value. The height of the remaining bins may be computed in a similar manner using the functions $f_1(x)$, $f_2(x)$, $f_3(y)$, and $f_4(y)$.

FIG. 7 depicts an example of generating a dense histogram by combining two piecewise approximations that each have two pieces. However, the number of piecewise approximations and/or pieces may vary, depending on the particular application. In some cases, a dense histogram may be generated using three or more piecewise approximations, which may have varying numbers of pieces. As a result, the number of bins may vary significantly depending on the number of start and end points defined across the aggregated piecewise approximations.

5.2 Aggregate Piecewise Approximations

The number of bins in a dense histogram may be significant when several piecewise approximations are being aggregated. In some embodiments, distribution modeler 112 transforms the dense histogram into a piecewise approximation to represent an aggregate distribution function to reduce the memory footprint. The aggregate piecewise approximation was also observed to be more accurate than the dense histogram upon validation tests, as summarized further below.

Figure 8:
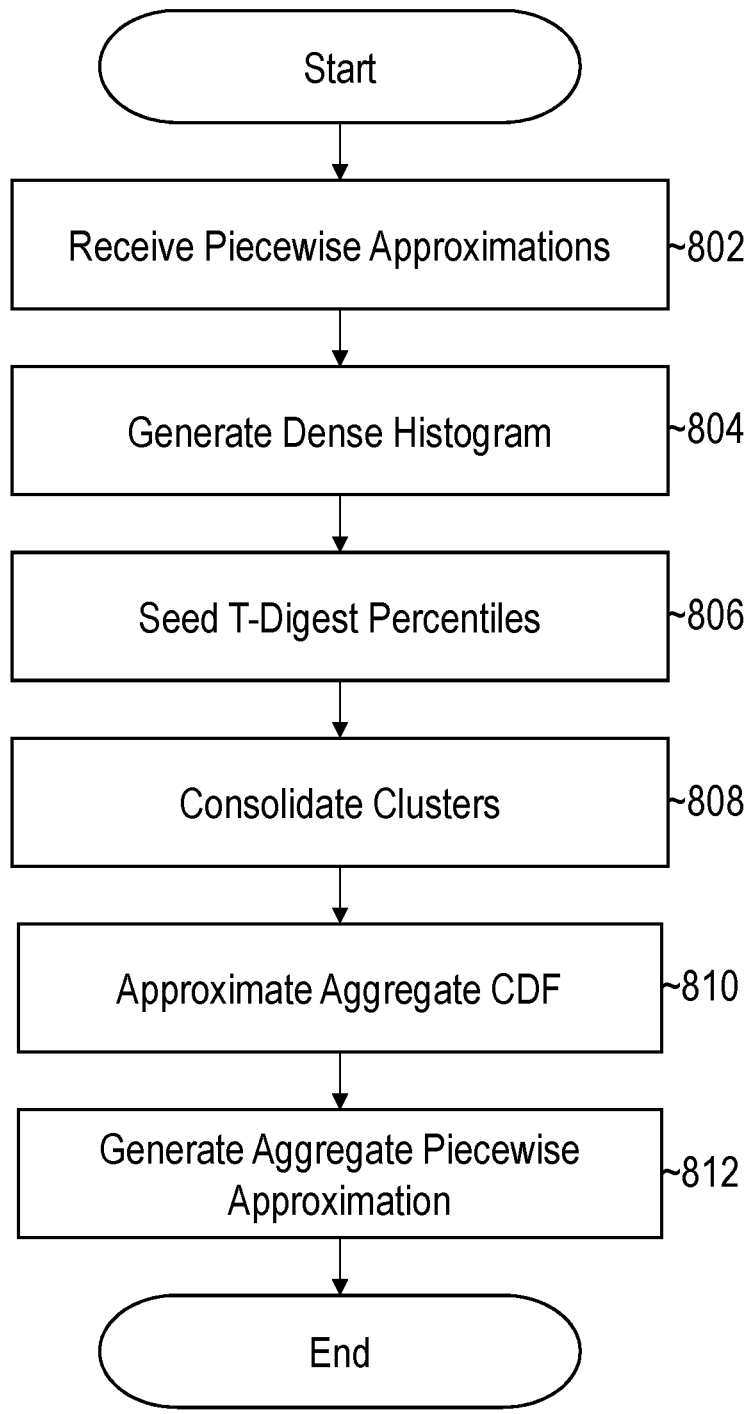
FIG. 8 illustrates an example set of operations for generating an aggregate piecewise approximation in accordance with some embodiments.

FIG. 8 illustrates an example set of operations for generating an aggregate piecewise approximation in accordance with some embodiments. The set of operations include receiving, as input, a plurality of piecewise approximations (Operation 802). For example, the plurality of piecewise approximations may include APLA CDF approximations for performance metrics across different resources. Additionally or alternatively, the piecewise approximations may include APLA CDF approximations for performance metrics collected over different intervals of time.

Responsive to receiving the piecewise approximations, the process generates, in volatile or non-volatile storage, a dense histogram (Operation 804). For example, the dense histogram may comprise a set of bins that have a width determined by the distinct start and end points of the APLA CDF. The height of each bin may be computed as a function of the piecewise approximations as described in the previous subsection.

The set of operations further includes seeding a t-digest percentile on the dense histogram (Operation 806). This operation may include generating a set of t-digest clusters that mirror the dense histogram. For example, a cluster may be generated for each bin. The centroid of the cluster may be the mean value for the bin. The height of the dense histogram may be assigned as the member count for the cluster. Seeding the t-digest percentiles may reduce the processing overhead involved in transforming the aggregate in-memory representation into a piecewise approximation.

The set of operation further includes consolidating the set of t-digest clusters to reduce the total number of clusters (Operation 808). This operation may include performing a one-pass merge of adjacent clusters such as previously described. That is, adjacent clusters are merged only if the result would not violate the upper limit defined by $dp(1-p)n$.

The set of operations further includes approximating an aggregate CDF based on the set of t-digest clusters (Operation 810). The CDF may be computed from a set of t-digest clusters by summing the contribution of the uniform distributions centered at each centroid, as previously described with respect to the individual piecewise approximations.

The set of operations further includes generating an aggregate piecewise approximation (Operation 812). For example, APLA may be used to fit one or more lines to the aggregate CDF. The aggregate CDF may or may not be simplified using the multi-pass approach previously described, depending on the particular implementation.

Figure 9:
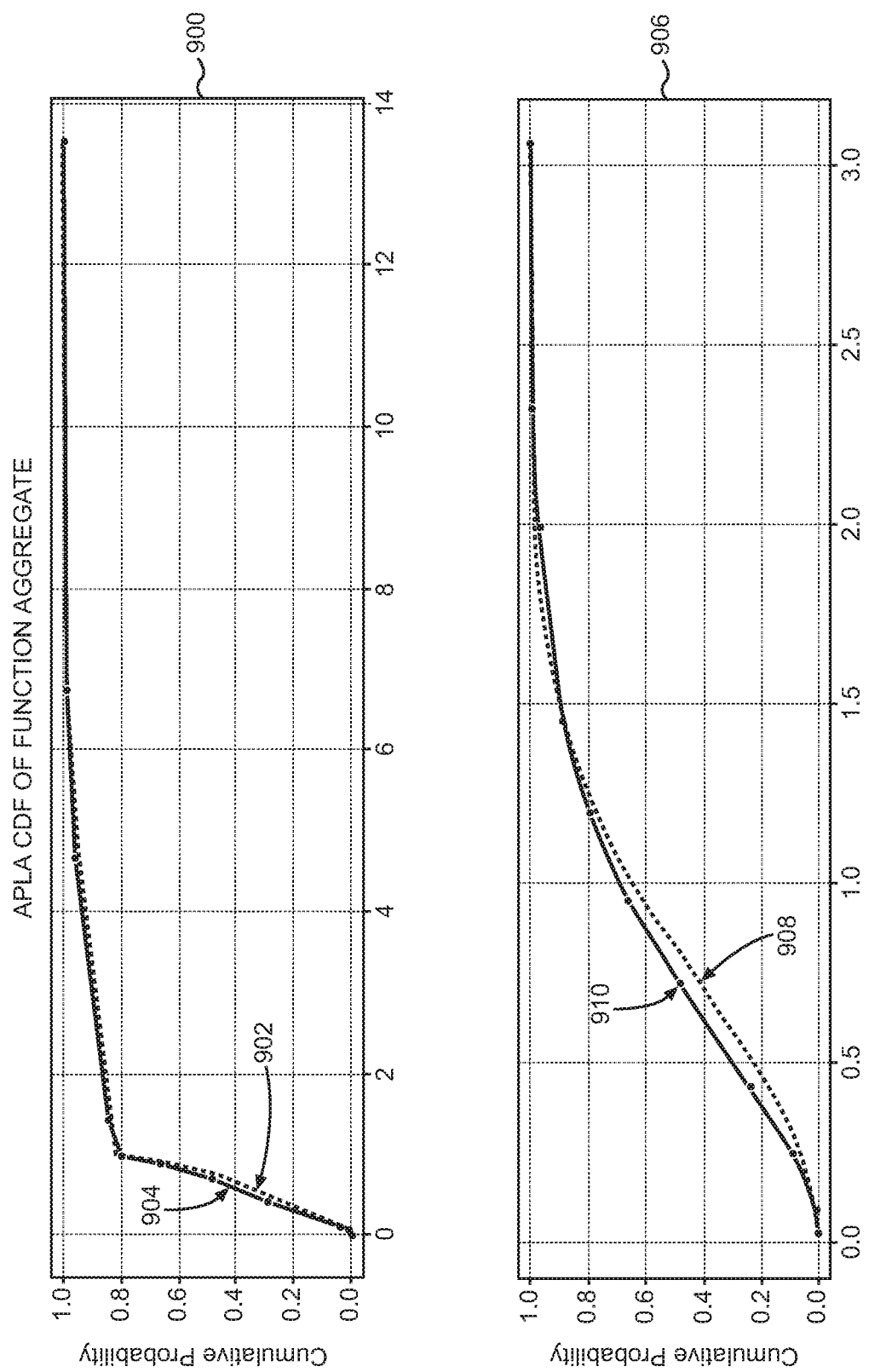
FIG. 9 illustrates example results of generating an aggregate piecewise approximation in accordance with some embodiments.

FIG. 9 illustrates example results of generating an aggregate piecewise approximation. Chart 900 depicts CDF 902 and CDF piecewise approximation 904. In this example, CDF piecewise approximation 904 includes eight lines that approximate a spike in the distribution followed by a gradual increase. Chart 906 depicts a much smoother CDF 908, which is approximated by CDF piecewise approximation 910. In this example, ten lines are fitted to CDF 908 to generate CDF piecewise approximation 910.

Figure 10:
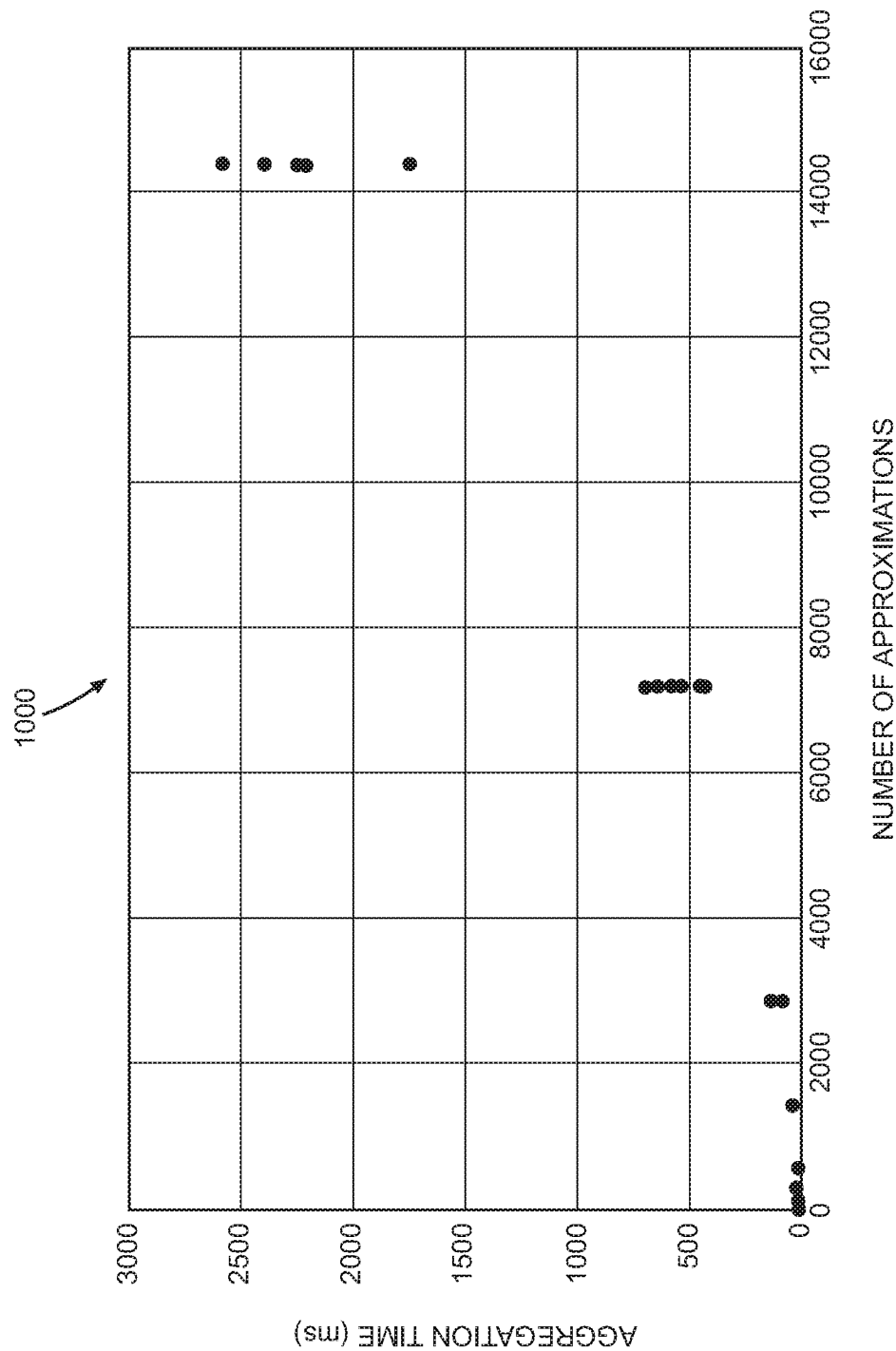
FIG. 10 illustrate example aggregation times of randomly generated experiments.

FIG. 10 illustrate example aggregation times of randomly generated experiments. In the experimental results depicted in chart 1000, up to 7200 approximations may be aggregated in sub-second time. The experiments were run on five days of minute aggregates. Further optimizations may allow for an even greater number of approximations to be aggregated in sub-second time. The aggregate APLA approximations were also found to vary between 0 to 8%. By comparison, the aggregate dense histograms had an error that varied between 0 and 24% for the same data sets. Thus, the APLA CDF approximations were able to provide relatively accurate results with little processing and memory overhead.

6. Distribution Model Evaluations

As illustrated above, the in-memory piecewise approximations allow distribution approximations to be generated and monitored in sub-second time. Additionally, piecewise approximations may represent the distribution of millions of data points with one kilobyte or less of memory. These optimizations allow applications to monitor and evaluate the distributions in real or quasi real-time.

In some embodiments, execution engine 114 is configured to evaluate queries and/or rules against individual and/or aggregate piecewise approximations. For example, execution engine 114 may evaluate requests to determine distribution-based statistics, such as percentiles, trimmed means and medians. As another example, execution engine 114 may evaluate rules for triggering automated actions based on patterns in the aggregate piecewise approximation. Based on the evaluation, execution engine 114 may generate visualizations, trigger one or more automated actions, and/or return a set of evaluation results.

Figure 11:
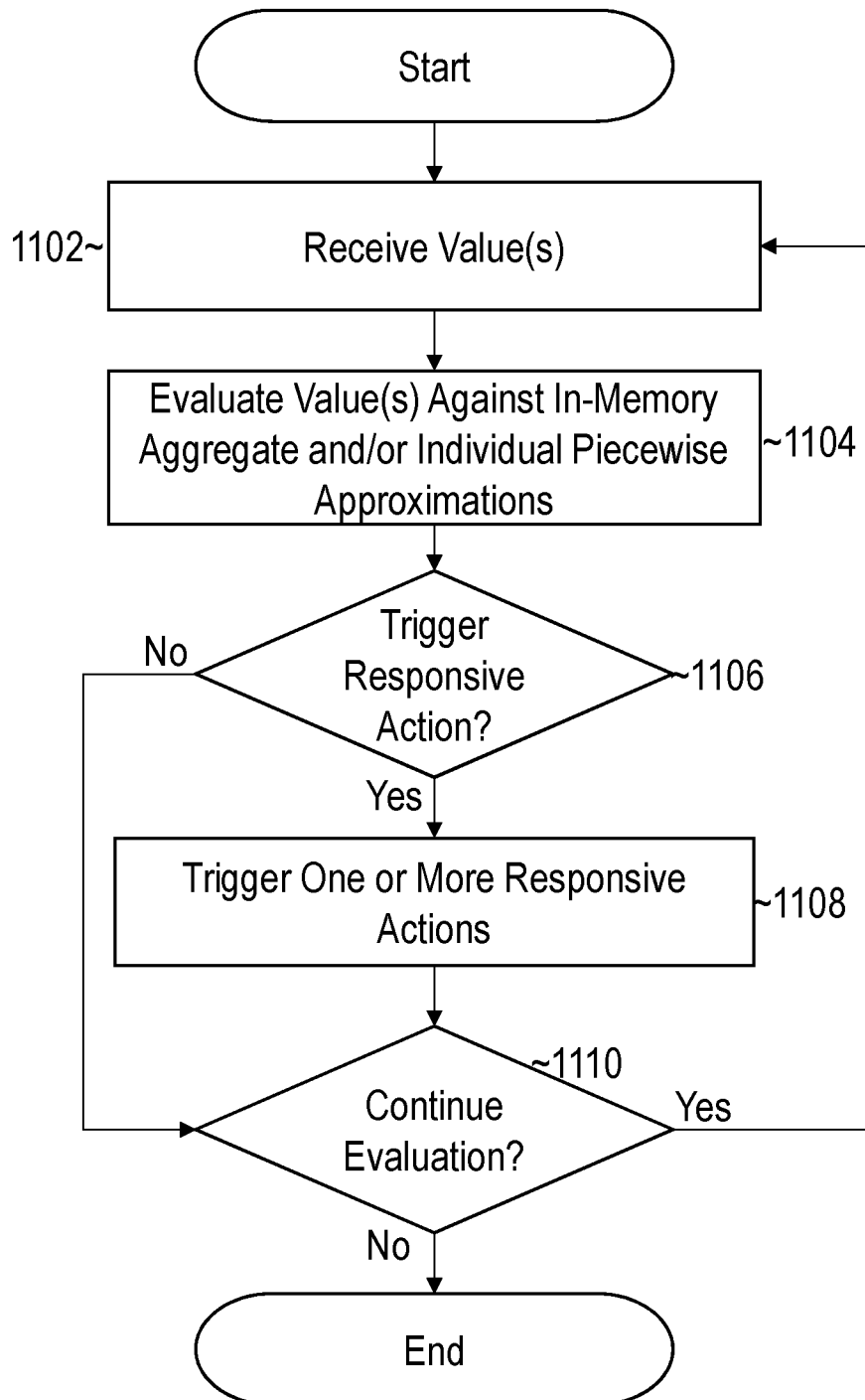
FIG. 11 illustrates an example set of operations for evaluating values against a piecewise approximation in accordance with some embodiments

FIG. 11 illustrates an example set of operations for evaluating values against a piecewise approximation in accordance with some embodiments. The set of operations includes receiving one or more values for evaluation. (Operation 1102). In some embodiments, the set of values are specified in a query. For example, a query may request that execution engine 114 return a metric value corresponding to a specified percentile. As another example a query may request that execution engine 114 return the percentile for a specified metric value.

In some embodiments, the one or more values received at operation 1102 are specified in rules. For example, a rule may trigger an alert and/or other automated action if the approximated distribution for a resource exceeds a threshold specified in a rule. The rules may be directed to detecting anomalies and/or remediating underperforming resources as described further below.

In some embodiments, the one or more values receives at operation include values collected from a software and/or hardware resource. For example, performance metrics, such as CPU utilization and memory throughput, may be collected by an agent on a host. Collection may occur continuously, periodically, or on demand.

Once received, the values are evaluated against an in-memory piecewise approximation (Operation 1104). The in-memory piecewise approximation may include an individual piecewise approximation and/or an aggregate piecewise approximation, which may be generated based on the techniques previously described. If not already in memory, the piecewise approximation of interest may be loaded by execution engine 114.

Based on the evaluation, process determines whether to trigger any responsive actions (Operation 1106). In some embodiments, the determination is made based on whether one or more thresholds are satisfied. For example, if the performance of a resource falls within a threshold percentile, then an automated action may be triggered.

If the process determines, based on the evaluation, that a responsive action should be triggered, then the process triggers one or more responsive actions (Operation 1108). In some embodiments, the automated actions are specified in rules, which may be user-defined or system-defined. Example automated actions may include generating and presenting visualizations, sending alerts, and performing auto-remediation actions to tune the performance of a computing resource.

The process further determines whether to continue evaluation (Operation 1110). Evaluations may be performed continuously, periodically, or on demand. For example, performance metrics for one or more resources may be periodically collected at sample intervals and evaluated against the piecewise approximations. The process may thus return to operation 1102 and repeat for the newly collected samples. Otherwise the process may end.

In some embodiments, visualizations are generated and presented based on the results of an evaluation. For example, the median response time for a server over a sample interval may be compared to the aggregate distribution as approximated by the piecewise approximations. A visualization, such as a histogram, may be generated and displayed that highlights the performance percentile for the server. The visualization may allow the user to initiate actions on the server, such as patch set updates and configuration changes, which may be helpful if the server has a significantly higher median response time than other servers in the cloud environment. Other visualizations, such as interactive graphs, bar charts, and menus, may also be generated and displayed based on the evaluation results.

In some embodiments, alerts are generated based on the results of an evaluation. For example, if the response time of a server exceeds a threshold percentile for longer than a threshold period of time, then an alert may be generated to notify a system administrator. The system administrator may then take appropriate corrective action to remediate the situation. As another example, an alert may be triggered if the median aggregate CPU utilization rate exceeds a threshold value.

In some embodiments, a set of one or more rules define the thresholds and conditions under which alerts are triggered. Rules may be user-defined, system-defined, or generated in any other manner. A rule may be associated with a rule specification, which may define the thresholds and conditions according to a predefined format, such as a declarative syntax. Execution engine 114 may read and parse the rule specification during the evaluation process. Execution engine 114 may monitor in-memory piecewise approximations to determine whether the alerting conditions are satisfied. The in-memory piecewise approximations may be updated as new sample values are collected. If the alerting conditions are satisfied, then execution engine 114 may send a notification, such as via email or short message service, to an account associated with a system administrator.

Additionally or alternatively, execution engine 114 may trigger one or more auto-remediation actions. For example, a resource or group of resources may be exhibiting anomalous behavior if the performance falls below a threshold percentile for longer than a threshold amount of time. Auto-remediation actions may be taken to try and resolve the problem. Example auto-remediation actions may include restarting the resource, stopping the resource, migrating connections/data to another resource, patching the resource, adjusting the configuration settings of the resource, starting a troubleshooting application on the resource, and/or redirecting incoming requests to other resources. The auto-remediation actions may be defined in rules, similar to the alerting conditions as previously described. The resource may be monitored to determine whether the auto-remediation actions bring the resource back to an expected level of performance, such as a median percentile. If not, additional auto-remediation actions may be performed and/or an alert may be sent to an administrator.

7. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

9. Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates computer system 1200 upon which an embodiment of the invention may be implemented. Computer system 1200 includes bus 1202 or other communication mechanism for communicating information, and a hardware processor 1204 coupled with bus 1202 for processing information. Hardware processor 1204 may be, for example, a general purpose microprocessor.

Computer system 1200 also includes main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes read only memory (ROM) 1208 or other static storage device coupled to bus 1202 for storing static information and instructions for processor 1204. Storage device 1210, such as a magnetic disk or optical disk, is provided and coupled to bus 1202 for storing information and instructions.

Computer system 1200 may be coupled via bus 1202 to display 1212, such as a cathode ray tube (CRT) or light emitting diode (LED) monitor, for displaying information to a computer user. Input device 1214, which may include alphanumeric and other keys, is coupled to bus 1202 for communicating information and command selections to processor 1204. Another type of user input device is cursor control 1216, such as a mouse, a trackball, touchscreen, or cursor direction keys for communicating direction information and command selections to processor 1204 and for controlling cursor movement on display 1212. Input device 1214 typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 1200 can receive the data on the network line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a first set of values that measure one or more metrics of at least one computing resource;
generating, within volatile or non-volatile memory, a set of clusters that approximate a distribution of the first set of values that measure the one or more metrics of the at least one computing resource, wherein generating the set of clusters comprises merging at least two adjacent clusters when a new cluster is added to the set of clusters;
determining, based at least in part on centroids in the set of clusters, a distribution function for the first set of values;
reducing a memory footprint of approximating the distribution by:
transforming, within volatile or non-volatile memory, the set of clusters to a piecewise approximation of the distribution function, wherein a number of pieces of the piecewise approximation are fit to different segments of the distribution function; and
reducing the number of pieces in the piecewise approximation until a quality of approximating the distribution does not satisfy a threshold.

2. The method of claim 1, wherein the first set of values is not retained in volatile or non-volatile memory after the set of clusters is generated.

3. The method of claim 1, further comprising: evaluating a second set of values that measure the one or more metrics of a particular computing resource against the piecewise approximation of the distribution function; identifying, based on the evaluation, a percentile associated with the second set of values; and generating an alert if the percentile falls outside of a threshold.

4. The method of claim 1, further comprising: performing one or more operations on a particular computing resource based on a result obtained by comparing one or more values to the piecewise approximation.

5. The method of claim 4, wherein the one or more operations comprises modifying one or more configuration settings of the particular computing resource, applying a patch on the particular computing resource, or shutting down the particular computing resource.

6. The method of claim 1, wherein the piecewise approximation is a linear piecewise approximation that is obtained by (a) computing a smoothed cumulative distribution function based on the set of clusters; (b) fitting a set of lines to the smoothed cumulative distribution function; and (c) removing at least one line from the set of lines until the quality of approximating the distribution does not satisfy the threshold.

7. The method of claim 1, wherein the distribution approximated by the set of clusters is a probability density function.

8. The method of claim 1, wherein generating the set of clusters comprise generating an ordered list of centroids; wherein each centroid of a cluster is associated with (a) a mean value computed from values, of the first set of values, assigned to the cluster and (b) a count value representing how many values from the first set of values were assigned to the cluster; wherein the count value is restricted to less than $dp(1-p)n$, where d is a configurable parameter that controls how many clusters are used to approximate the distribution, p is an estimated quantile for the mean value associated with the centroid, and n represents a number of values in the first set of values.

9. The method of claim 1, wherein the piecewise approximation represents a cumulative distribution of at least one of page load times or response times on a server, the method further comprising: performing one or more actions on the server to tune a performance of the server based on an evaluation of the piecewise approximation.

10. One or more non-transitory computer-readable media storing instructions which, when executed by one or more hardware processors, cause one or more computing devices to implement a process comprising:
receiving a first set of values that measure one or more metrics of at least one computing resource;
generating, within volatile or non-volatile memory, a set of clusters that approximate a distribution of the first set of values that measure the one or more metrics of the at least one computing resource, wherein generating the set of clusters comprises merging at least two adjacent clusters when a new cluster is added to the set of clusters;
determining, based at least in part on centroids in the set of clusters, a distribution function for the first set of values;
reducing a memory footprint of approximating the distribution by:
transforming, within volatile or non-volatile memory, the set of clusters to a piecewise approximation of the distribution function, wherein a number of pieces of the piecewise approximation are fit to different segments of the distribution function; and
reducing the number of pieces in the piecewise approximation until a quality of approximating the distribution does not satisfy a threshold.

11. The one or more non-transitory computer-readable media of claim 10, wherein the first set of values is not retained in volatile or non-volatile memory after the set of clusters is generated.

12. The one or more non-transitory computer-readable media of claim 10, wherein the process further comprises: evaluating a second set of values that measure the one or more metrics of a particular computing resource against the piecewise approximation of the distribution function; identifying, based on the evaluation, a percentile associated with the second set of values; and generating an alert if the percentile falls outside of a threshold.

13. The one or more non-transitory computer-readable media of claim 10, wherein the process further comprises: performing one or more operations on a particular computing resource based on a result obtained by comparing one or more values to the piecewise approximation.

14. The one or more non-transitory computer-readable media of claim 13, wherein the one or more operations comprises modifying one or more configuration settings of the particular computing resource, applying a patch on the particular computing resource, or shutting down the particular computing resource.

15. The one or more non-transitory computer-readable media of claim 10, wherein the piecewise approximation is a linear piecewise approximation that is obtained by (a) computing a smoothed cumulative distribution function based on the set of clusters; (b) fitting a set of lines to the smoothed cumulative distribution function; and (c) removing at least one line from the set of lines until the quality of approximating the distribution does not satisfy the threshold.

16. The one or more non-transitory computer-readable media of claim 10, wherein the distribution approximated by the set of clusters is a probability density function.

17. The one or more non-transitory computer-readable media of claim 10, wherein generating the set of clusters comprise generating an ordered list of centroids; wherein each centroid of a cluster is associated with (a) a mean value computed from values, of the first set of values, assigned to the cluster and (b) a count value representing how many values from the first set of values were assigned to the cluster; wherein the count value is restricted to less than $dp(1-p)n$, where d is a configurable parameter that controls how many clusters are used to approximate the distribution, p is an estimated quantile for the mean value associated with the centroid, and n represents a number of values in the first set of values.

18. The one or more non-transitory computer-readable media of claim 10, wherein the piecewise approximation represents a cumulative distribution of at least one of page load times or response times on a server, wherein the process further comprises: performing one or more actions on the server to tune a performance of the server based on an evaluation of the piecewise approximation.

19. The one or more non-transitory computer-readable media of claim 10, wherein the process further comprises evaluating a set of one or more rules against the piecewise approximation; and in response to evaluating the set of one or more rules, determining that a condition for triggering one or more automated actions has been satisfied; and performing the one or more automated actions.

20. A system comprising:
one or more hardware processors;
one or more non-transitory computer-readable media storing instructions which, when executed by the one or more hardware processors, cause the system to perform operations comprising:
receiving a first set of values that measure one or more metrics of at least one computing resource;
generating, within volatile or non-volatile memory, a set of clusters that approximate a distribution of the first set of values that measure the one or more metrics of the at least one computing resource, wherein generating the set of clusters comprises merging at least two adjacent clusters when a new cluster is added to the set of clusters;

determining, based at least in part on centroids in the set of clusters, a distribution function for the first set of values;

reducing a memory footprint of approximating the distribution by:

transforming, within volatile or non-volatile memory, the set of clusters to a piecewise approximation of the distribution function, wherein a number of pieces of the piecewise approximation are fit to different segments of the distribution function; and reducing the number of pieces in the piecewise approximation until a quality of approximating the distribution does not satisfy a threshold.

* * * * *

UNITED STATES PATENT AND TRADEMARK OFFICE
CERTIFICATE OF CORRECTION

| | |
|---|---|
| PATENT NO. | : 10,963,346 B2 |
| APPLICATION NO. | : 16/000677 |
| DATED | : March 30, 2021 |
| INVENTOR(S) | : Garvey et al. |

It is certified that error appears in the above-identified patent and that said Letters Patent is hereby corrected as shown below:

On the Title Page

Column 1, under Assignee, Line 1, delete "international" and insert -- International --, therefor.

In the Specification

In Column 1, Line 67, after "sample;" delete "and".

In Column 2, Line 29, delete "embodiments" and insert -- embodiments; and --, therefor.

In Column 14, Line 52, delete "512" and insert -- 512. --, therefor.

In Column 17, Line 54, delete "$f_1(x_0)*no,$" and insert -- $f_1(x_0)*n_0,$ --, therefor.

Signed and Sealed this
Third Day of August, 2021

Drew Hirshfeld
*Performing the Functions and Duties of the
Under Secretary of Commerce for Intellectual Property and
Director of the United States Patent and Trademark Office*